United States Patent
Bergqvist et al.

(10) Patent No.: US 11,330,483 B2
(45) Date of Patent: May 10, 2022

(54) SYSTEM INFORMATION ACQUISITION DURING HANDOVER

(71) Applicant: TELEFONAKTIEBOLAGET LM ERICSSON (PUBL), Stockholm (SE)

(72) Inventors: Jens Bergqvist, Linköping (SE); Janne Peisa, Espoo (FI); Icaro L. J. da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 146 days.

(21) Appl. No.: 16/620,967

(22) PCT Filed: Jul. 10, 2018

(86) PCT No.: PCT/IB2018/055086
§ 371 (c)(1),
(2) Date: Dec. 10, 2019

(87) PCT Pub. No.: WO2019/012430
PCT Pub. Date: Jan. 17, 2019

(65) Prior Publication Data
US 2020/0205047 A1     Jun. 25, 2020

Related U.S. Application Data

(60) Provisional application No. 62/532,481, filed on Jul. 14, 2017.

(51) Int. Cl.
*H04W 36/00* (2009.01)
*H04W 36/08* (2009.01)

(52) U.S. Cl.
CPC ....... *H04W 36/0077* (2013.01); *H04W 36/08* (2013.01)

(58) Field of Classification Search
CPC . H04W 36/0069; H04W 36/04; H04W 36/08; H04W 36/30; H04W 36/0033; H04W 36/0077; H04W 40/22
See application file for complete search history.

(56) References Cited

U.S. PATENT DOCUMENTS

2009/0239539 A1*   9/2009   Zhang ................ H04W 76/28
                                                                                           455/436
2011/0105120 A1    5/2011   Abdel-Samad et al.
(Continued)

FOREIGN PATENT DOCUMENTS

EP         3001740 A1    3/2016

OTHER PUBLICATIONS

Mediatek Inc, "Stored System Information for OSI", 3GPP TSG-RAN2 #96 Meeting, Reno, USA, Nov. 14-18, 2016, R2-168148, 3GPP, 4 pages.
(Continued)

*Primary Examiner* — Allahyar Kasraian
(74) *Attorney, Agent, or Firm* — Sage Patent Group

(57) ABSTRACT

A method of operating a wireless device includes transmitting, to a serving node, an indication of system information configurations stored by the wireless device, the indication including a plurality of indices each corresponding to a respective system information configuration stored by the wireless device. The wireless device receives a handover command instructing the wireless device to access a target cell, wherein the handover command indicates a selected one of the plurality of indices corresponding to the target cell, and accesses the target cell using a system information configuration corresponding to the selected one of the plurality of indices.

12 Claims, 18 Drawing Sheets

(56) References Cited

U.S. PATENT DOCUMENTS

| | | | | |
|---|---|---|---|---|
| 2014/0148146 | A1* | 5/2014 | Jung | H04W 36/0094 455/418 |
| 2017/0332372 | A1* | 11/2017 | Lee | H04W 36/0061 |
| 2018/0263074 | A1* | 9/2018 | Wang | H04W 4/06 |
| 2020/0084694 | A1* | 3/2020 | Kim | H04W 36/00 |

OTHER PUBLICATIONS

Mediatek Inc, "SI Index for Stored System Information", 3GPP TSG-RAN2 #97bis Meeting, Spokane, US, Apr. 3-7, 2017, R2-1702790, 3GPP, 6 pages.

Ericsson, "Further details of handover execution in NR", 3GPP TSG-RAN WG2 Ad Hoc on NR, Qingdao, China, Jun. 27-29, 2017, Tdoc R2-1707276, 3GPP, 8 pages.

* cited by examiner

Case c/

Case d/

SYSTEM INFORMATION ACQUISITION DURING HANDOVER

RELATED APPLICATION

The present application is a 371 of International Application No. PCT/IB2018/055086, filed Jul. 10, 2018, which claims the benefit of and priority to U.S. Provisional Patent Application No. 62/532,481, filed Jul. 14, 2017, entitled "FURTHER ENHANCEMENTS FOR SYSTEM INFORMATION ACQUISITION DURING HANDOVER," the disclosure of which are hereby incorporated herein by reference in their entirety.

BACKGROUND

The present disclosure relates to communication systems, and in particular to cellular communication systems that perform handover of wireless terminals from serving nodes, or source nodes, to target nodes.

In cellular telecommunications, the terms "handover" or "handoff" refer to the process of transferring an ongoing connection with a wireless terminal, such as a call or data session, from one serving cell, node or channel to another serving cell, node or channel. When a handover to another node occurs, the node to which the wireless terminal is handed over is referred to as a "target node." When a wireless terminal (e.g., a user equipment, or UE) is handed over to a target node, the wireless terminal must obtain minimum system information (SI) about the target node to be able, for example, to access the random access channel (RACH) of the target node.

Connecting to a cell is sometimes referred to as "camping" on the cell. For a cell/frequency that is considered for camping by the UE, the UE may acquire the contents of the minimum SI of that cell/frequency from another cell/frequency layer and/or may apply stored SI from previously visited cell(s) to a new cell. However, if the UE cannot determine the minimum SI of a new cell (by receiving the SI from that cell or from another cell or from SI stored from previous cells), the UE considers the new cell to be barred.

SUMMARY

A method of operating a wireless device in a wireless communication network is provided, wherein the wireless device is served by a serving node in the wireless communication network. The method includes transmitting, to the serving node, an indication of system information configurations stored by the wireless device, wherein the indication of system information configurations includes a plurality of indices, each of the plurality of indices corresponding to a respective system information configuration stored by the wireless device, receiving, from the serving node, a handover command instructing the wireless device to access a target cell in the wireless communication network, wherein the handover command indicates a selected one of the plurality of indices corresponding to the target cell, and accessing the target cell using a selected system information configuration corresponding to the selected one of the plurality of indices. The indices may include value-tags.

Each of the plurality of indices may correspond to a cell in the wireless communication network.

Each of the plurality of indices may to a group of cells in the wireless communication network, and the selected one of the plurality of indices may correspond to a selected group of cells including the target cell.

Each of the plurality of indices may correspond to an area identifier (Area ID) that corresponds to an associated group of cells in the wireless communication network.

The system information configurations may include system information blocks, SIBs, that include parameters for accessing a corresponding target cell in the communication network.

The parameters for accessing the corresponding target cell may include common random access channel, RACH, configurations.

The system information configurations may include master information blocks, MIBs, that include parameters for accessing a corresponding target cell in the communication network.

Transmitting the indication of system information configurations stored by the wireless device to the serving node may include transmitting the indication of system information configurations stored by the wireless device during a connection resume procedure.

The connection resume procedure may include a radio resource control, RRC, Connection Resume request, an RRC Connection Reactivation message, an RRC Connection Resume Complete message, or an RRC Connection Reactivation Complete message.

Transmitting the indication of system information configurations stored by the wireless device to the serving node may include transmitting the indication of system information configurations stored by the wireless device during a connection setup procedure.

Transmitting the indication of system information configurations stored by the wireless device to the serving node may include transmitting the indication of system information configurations stored by the wireless device with a radio resource control, RRC, measurement report.

Transmitting the indication of system information configurations stored by the wireless device to the serving node may include transmitting the indication of system information configurations stored by the wireless device with a radio resource control, RRC, Handover complete.

A method of operating a wireless device in a wireless communication network is provided, wherein the wireless device is served by a serving node in the wireless communication network. The method includes receiving, from the serving node, a handover command instructing the wireless device to access a target cell in the wireless communication network, wherein the handover command indicates an index, retrieving a selected system information configuration corresponding to the index from a plurality of system information configurations stored at the wireless device, each of the plurality of system information configurations being associated with a corresponding index, and accessing the target cell using a selected system information configuration.

Each value-tag may correspond to a cell in the wireless communication network, and the selected system information configuration may correspond to the target cell.

Each value-tag may correspond to a group of cells in the wireless communication network, and the selected system information configuration may correspond to a selected group of cells including the target cell.

Each value-tag may correspond to an area identifier (Area ID) that corresponds to an associated group of cells in the wireless communication network.

The system information configurations may include system information blocks, SIBs, that include parameters for accessing a corresponding target cell in the communication network.

The parameters for accessing the corresponding target cell may include common random access channel, RACH, configurations.

The system information configurations may include master information blocks, MIBs, that include parameters for accessing a corresponding target cell in the communication network.

A method of operating a serving node in a wireless communication network is provided, wherein the serving node serves a wireless device in a serving cell in the wireless communication network. The method includes receiving, at the serving node, a plurality of indices, each of the plurality of indices corresponding to a respective system information configuration stored by the wireless device, transmitting the plurality of indices to a target node, receiving, from the target node, a selected value-tag from the plurality of indices for use in accessing a target cell served by the target node, and transmitting, to the wireless device, a handover command instructing the wireless device to access the target cell, wherein the handover command indicates the selected value-tag to enable the wireless device to access the target cell using the respective stored system information configuration corresponding to the selected index.

The plurality of indices may be provided to the target node in a transparent radio resource control, RRC, container.

The plurality of indices may be provided to the target node in a Handover Preparation Message.

The plurality of indices may be provided to the target node in an AS-Config information element.

The plurality of indices may correspond to system information configurations for a plurality of cells served by the target node, the plurality of cells including the target cell.

The plurality of indices correspond to system information configurations for a plurality of cells, the plurality of cells including cells served by the target node and cells not served by the target node.

The plurality of indices may include indices associated with an area identifier to which the target node belongs.

The plurality of indices may include indices associated with a plurality of area identifiers including an area identifier to which the target node belongs.

A method of operating target node in a wireless communication network is provided, wherein the target node serves a target cell in the wireless communication network. The method includes receiving, from a serving node, a plurality of indices, each of the plurality of indices corresponding to a respective system information configuration stored by a wireless device served by the serving node, determining whether any of the plurality of indices correspond to a system information configuration that can be used by the wireless device to access the target cell, in response to determining that at least one of the plurality of indices correspond to a system information configuration that can be used by the wireless device to access the target cell, selecting an index from the plurality of indices, wherein the selected value-tag corresponds to a system information configuration that can be used to access the target cell, and transmitting a handover command instructing the wireless device to access the target cell.

The handover command may indicate the selected value-tag to enable the wireless device to access the target cell using the system information configuration corresponding to the selected index.

The method may further include, in response to determining that none of the plurality of indices correspond to a system information configuration that can be used by the wireless device to access the target cell, including system information for accessing the target cell in the handover command.

Transmitting the handover command to the wireless device may include transmitting the handover command to the serving node in a transparent radio resource control, RRC, container.

DETAILED DESCRIPTION

Figure 1:
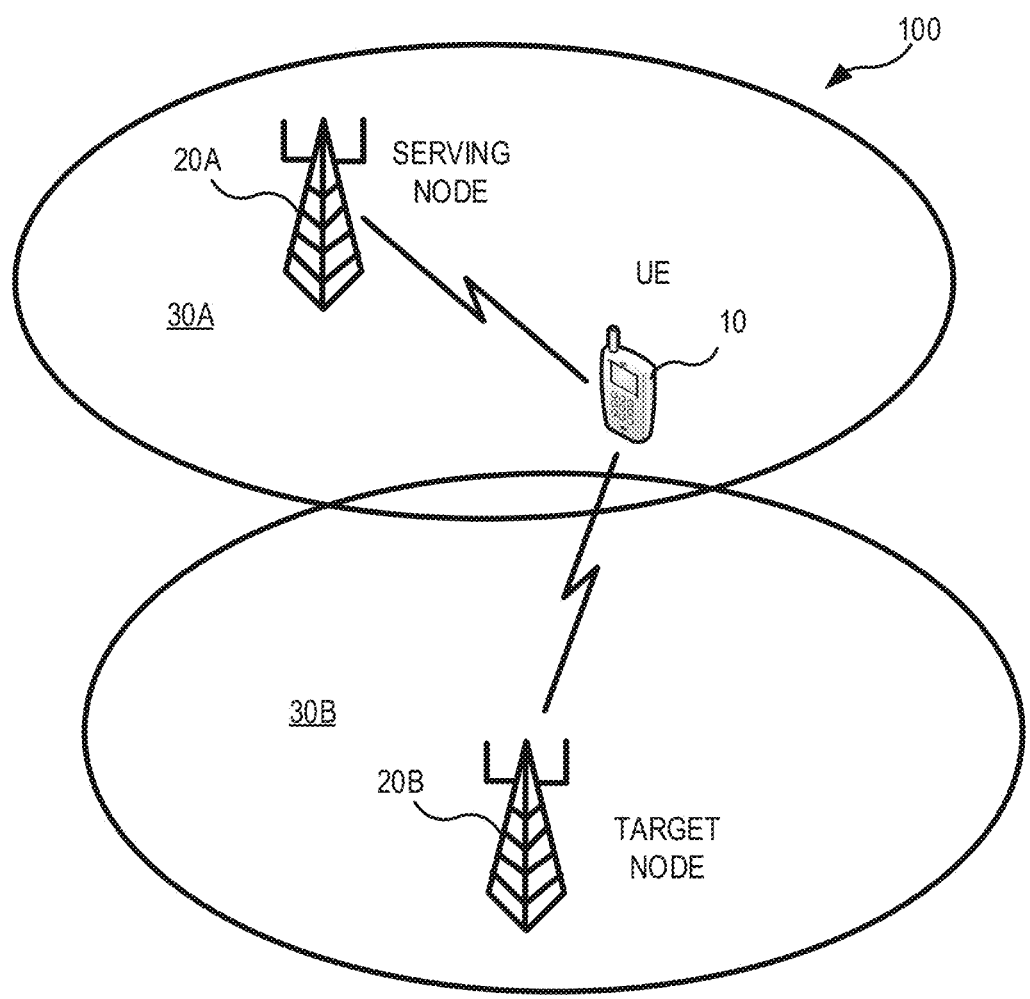
FIG. 1 illustrates a wireless communication system in which embodiments of the inventive concepts may be employed.

New Radio (NR) is a new air interface standard being developed by the Third Generation Partnership Project (3GPP) for 5G Long Term Evolution (LTE) communications systems. It is believed that the NR specification will allow the UE to apply stored system information from previously visited cells. For example, in RAN2 #97, the following has been agreed concerning system information re-acquisition:

---

Agreements
1: Broadcasting some kind of index/identifier in minimum SI to enable the UE to avoid re-acquisition of already stored SI-block(s)/SI message(s). The index/identifier and associated system information can be applicable in more than one cell. System information valid in one cell may be valid also in other cells.
FFS [for further study] what the index/identifier is (e.g. single index or area plus value-tag, etc)

---

The agreements regarding acquisition or re-acquisition of system information do not describe in which procedures that could occur, for example, during handovers. In RAN2 #98, further progress was made and the following was agreed regarding the concepts of Area ID (where multiple cells sharing the same Area ID would have the same set of system information configurations, where each configuration could be indexed using an index such as a value-tag) and value-tags for system information:

---

Agreements
There will be at least a value-tag and area ID
value-tag is associated to each SIB
value-tag can be valid in only one cell or when combined with an area ID to be valid in more than one cell.
FFS whether the area ID and valuetag is separately signalled or as a single identifier
FFS whether the area ID is associated to each SIB/SI message or associated to a group of SIBs/SI messages or all SIBs/SI messages.

---

The NR Study Item Technical Report (TR) provides some indication on how system information will be encoded in NR and introduces the term "minimum system information" as follows:
  The minimum SI comprises basic information required for initial access to a cell and information for acquiring any other SI broadcast periodically or provisioned via on-demand basis, i.e. scheduling information. The other SI encompasses everything not broadcast in the minimum SI.
  With regards to system information provisioning on stage-3 level:
    The minimum SI includes at least SFN, list of PLMN, Cell ID, cell camping parameters, RACH parameters.
    A unique global cell ID is broadcast for an NR cell.
  More recently, in RAN1, it has been agreed that for contention-based random access, an association between a synchronous signal (SS) block in the SS burst set and a subset of RACH resources and/or preamble indices is configured by a set of parameters in Remaining Minimum System Information (RMSI), where RMSI refers to the minimum system information that not carried by the Physical Broadcast Channel (PBCH) in NR, only limited to the Master Information Block (MIB).

There currently exist certain challenge(s) in the acquisition of minimum system information by wireless terminals. In LTE, the handover command (or RRCConnectionReconfiguration with mobilityControlInfo) will include system information needed to access the target cell. It may also include the entire system information block (SIB) SIB1. In NR, the same system information may be valid for multiple cells, and the UE may already have the system information for the target cell. This may lead to unnecessary information being transmitted over the air interface. Since the NR system information may contain information valid for multiple cells, it may also be larger than typical LTE system information.

Certain aspects of the present disclosure and the embodiments disclosed herein may provide solutions to these or other challenges. Accordingly, various embodiments are described herein which address one or more of these issues.

According to some embodiments, a method is performed by a UE by which the UE can inform a serving or source node (e.g, a gNodeB associated to the serving cell the UE is connected to) of the versions (or configurations) of system information that the UE has stored. In particular, a UE may have stored one or more common RACH configurations, possibly indicated/indexed by value-tags.

According to other embodiments, a method is performed by a serving node by which the serving node can indicate to a target node whether and which version(s) of stored system information an incoming UE (or groups of UEs, in the case of group-based handover) may have available.

According to further embodiments, a method is performed by a target node by which the target node indicates to an incoming UE (via the serving node, using, for example, a transparent RRC container) which version of system information stored at the incoming UE should be used to access the target during a handover execution. In particular, the target node can indicate to a UE which version of a common RACH configuration should be used to access the target cell.

According to further embodiments, a method is performed by a UE by which the UE receives a handover command prepared by the target node and forwarded by the serving node containing information enabling the UE to access the target node and indicating which version of system information stored by the UE should be used to access the target cell. In particular, the UE may receive a handover command prepared by the target node and forwarded by the serving node indicating which common RACH configuration should be used by the UE to access a target cell.

According to additional embodiments, various devices and/or systems (e.g., UE, network nodes) are disclosed for performing the methods described herein. All of these embodiments are described in more detail below.

Certain embodiments may provide one or more of the following technical advantage(s). For instance, certain embodiments may avoid unnecessary transmission of system information in the handover command, increasing the handover performance and system capacity. That is especially important in NR where the amount of system information needed to complete a handover (e.g. common RACH configuration associated to the target cell) might expand compared to LTE, since the target may need to provide a set of configurations, which in a worst-case scenario, could be one per accessible beam. For example, if a target node defines 64 beams for the SS block transmission, the Common RACH configuration would consist of potentially 64 RACH configurations, one per potential SS block beam, within a radio frame that could be the best when the UE tries to access the target cell. The approaches described herein may also reduce the amount of information exchanged over the inter-node interface between a serving gNodeB and a target gNodeB.

Furthermore, this disclosure describes cases in which the UE may have stored system information configurations that are valid for multiple cells, enabled thanks to the NR framework for system information acquisition. If LTE procedure for handover were followed in as NR system, the serving node would provide its system information to the target node, which would provide parts of its system information (e.g. common RACH configuration) to the serving node, which would be sent to the UE in the handover command. Some embodiments described herein may improve both inter-node signalling and handover signalling over the air interface. Certain embodiments may provide all, some, or none of these technical advantages. Other technical advantages may be readily apparent.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Although 3GPP has not fully defined all details as to how system information will be encoded in NR compared to LTE (where a master information block, or MIB, and multiple system information blocks, or SIBs, are defined), the Technical Report (TR) written as an outcome of the NR study item indicates that the Common RACH configuration (which in LTE is contained in the information element (IE) rach-ConfigCommon) will be part of one of the SIBs in NR (most likely, either NR-SIB1 or NR-SIB2). In RAN1 terminology, the common RACH configuration will be carried in the so-called Remaining Minimum System Information (RMSI).

Also, according to the 3GPP agreements described above, there will be a value-tag associated to a SIB validity and, consequently, to a common RACH configuration validity. And, if combined with an area ID, that validity could also expand to more than one cell. Therefore, in NR, upon receiving a handover command from the serving node telling the UE to access a given target cell, the UE may already have stored a valid common RACH configuration for the target indicated in mobilityControlInfo.

Although it is not defined in 3GPP how the area ID and value-tag per SIB will be signalled, the NR framework should have clear mechanisms to avoid the re-acquisition of system information. In the case of handovers, reducing the amount of information in the handover command (likely to be encoded as the mobilityControlInfo generated by target to the UE and transparently transferred via the source in an RRCConnectionReconfiguration message) is quite beneficial. Considering the common RACH configuration, for example, the network may need to potentially include information for all potentially accessible SS blocks (and/or dedicated CSI-RS to RACH mapping configuration) the UE may access in a target node, which could increase that information compared to LTE where a single RACH per cell information was provided.

Previously, it has been proposed that the minimization of system information reacquisition can be achieved by the source node informing the target node about the system information in the source cell, allowing the target node to avoid sending unnecessary system information to the UE in the hand-over command. Upon detecting that there is no system information in hand-over command, the UE can then use the system information from the source cell.

In that approach, the source node informs the target node about the system information in the source cell, e.g., by including the complete system information in the handover request message. The target node checks to see if the UE already has valid system information. If the UE does not have the system information from the source node, the target node will include it in the handover command. If the UE has valid information from the source node, the target node will not include it in the handover command. If the UE detects that there is no system information in handover command, the UE uses the system information acquired from the source cell.

In another embodiment, the UE can send, via measurement reports to the serving cell, a flag indicating that it has acquired system information for a given cell, such as the ones included in the measurement reports. That flag may also contain an indication of its validity. The serving node may receive that information and possibly inform a target node so that the target node is not required to include system information in the handover command prepared for that UE, and transmitted via an inter-node interface.

Building upon this approach, the present disclosure provides further embodiments that can be achieved within the NR framework for system information distribution and system information acquisition based on the fact that in NR, as in LTE, value-tag, which is some kind of version identifier, is associated to each SIB. Moreover, in NR, as in LTE, value-tag can be valid in only one cell but in NR, the UE could benefit from storing system information versions (using the value-tag) associated to multiple cells, and also in NR, different from LTE, the UE can apply previously acquired system information from other cells.

Figure 2A:
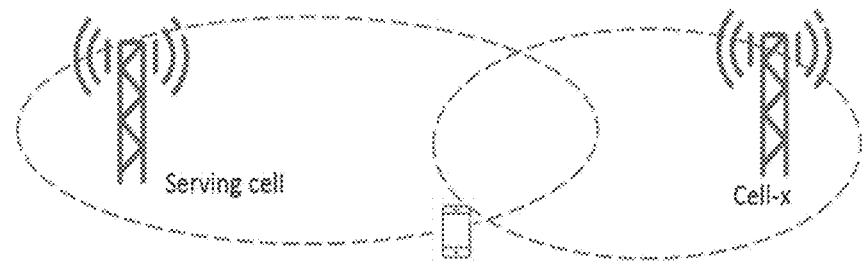
FIGS. 2A to 2F illustrate various scenarios in which embodiments of the inventive concepts may be employed.

In that case, the UE may already have stored common RACH configuration(s) of target cells upon handovers, in addition of course to the common RACH configuration of the serving cell(s). Assuming that the common RACH configuration is part of system information and transmitted in some NR-SIB (e.g. NR-SIB1 or NR-SIB-2), there can be the following cases for a given UE concerning which information the UE has stored:

Case a: Referring to FIG. 2A, a UE may have stored at least one common RACH configuration for a neighbor Cell-x associated to value-tag=x(1), where the value-tag can be associated to the whole SIB carrying the common RACH configuration.

Figure 2B:
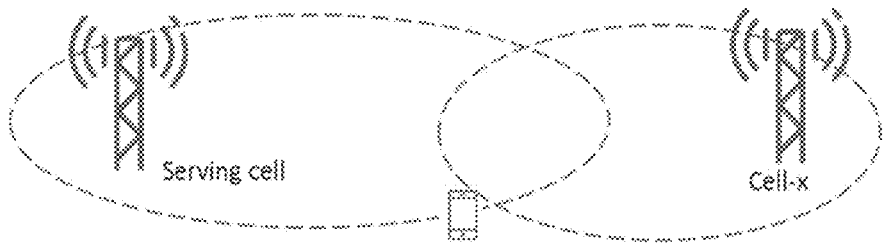

Case b: Referring to FIG. 2B, a UE may have stored multiple common RACH configuration(s) for Cell-x associated to value-tag=x(1), . . . , value-tag=x(K) (where the value-tag can be associated to the whole SIB carrying the common RACH configuration).

Figure 2C:
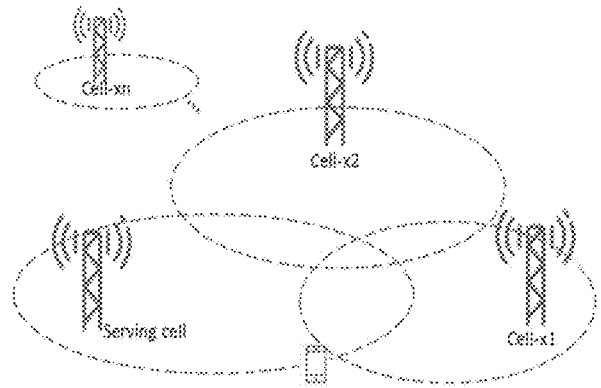

Case c: Referring to FIG. 2C, a UE may have stored multiple sets of common RACH configuration(s) where each set is defined as follows:

Cell-x1 with value-tag=x1(1), . . . , x1(K1)
Cell-x2 with value-tag=x2(1), . . . , x2(K2)
. . .
Cell-xn with value-tag=xn(1), . . . , xn(Kn)

In addition, there can also be different assumptions regarding an Area ID associated to these value-tags which could be valid not only for a cell but for multiple cells, a completely new concept of NR compared to LTE, as discussed below.

Figure 2D:
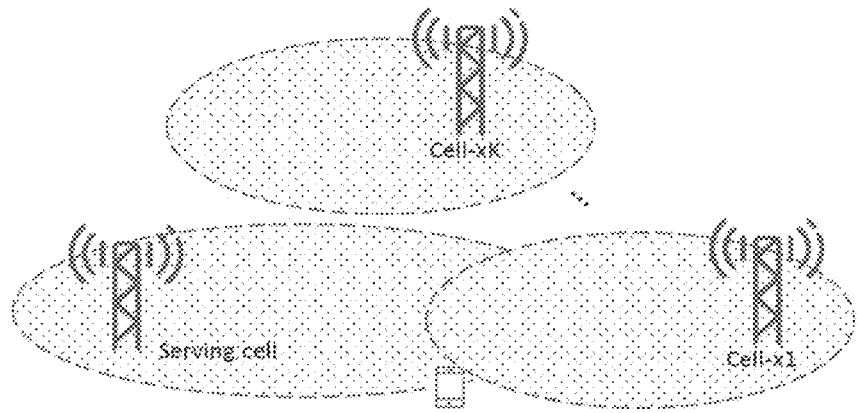

Case d: Referring to FIG. 2D, a UE may have stored at least one common RACH configuration for Area ID-x associated to value-tag=x1 (where the value-tag can be associated to the whole SIB carrying the common RACH configuration) where this area ID is the same for a set of cells Cell-x1, Cell-x2, Cell-xK. At least for handover, the UE may not need to know the association between Area ID, serving cell and neighbour cells.

Figure 2E:
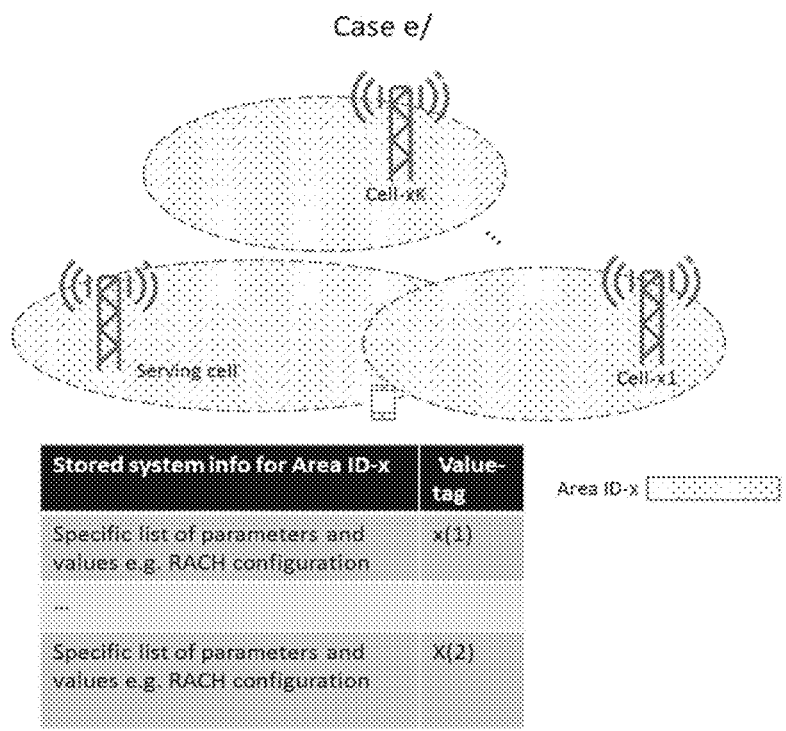

Case e: Referring to FIG. 2E, a UE may have stored multiple common RACH configuration(s) for Area ID-x associated to value-tag=x(1), . . . , value-tag=x(K), where each value-tag can be associated to the whole SIB carrying the common RACH configuration, and where this area ID is the same for a set of cells Cell-x1, Cell-x2, Cell-Xk.

Figure 2F:
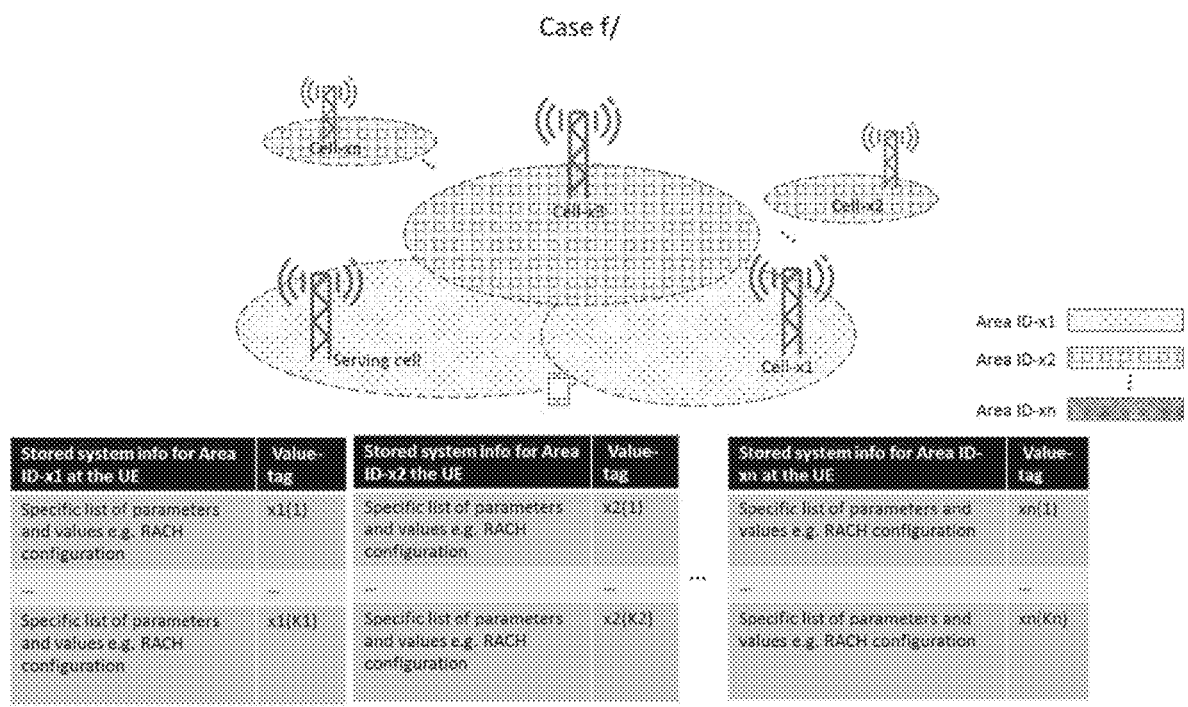

Case f: Referring to FIG. 2F, a UE may have stored multiple sets of common RACH configuration(s) where each set is defined as follows:

Area ID-x1 with value-tag=x1(1), . . . , x1(K1)
Area ID-x2 with value-tag=x2(1), . . . , x2(K2)
. . .
Area ID-xn with value-tag=xn(1), . . . , xn(Kn)

In this case, each Area ID-xi is the same for a set of cells, e.g. Area ID-x1 can comprise multiple cells.

In the following we describe more detailed embodiments related to the method(s) summarized above. It will be appreciated that these embodiments are for illustrative purposes, and other specific embodiments and variations are within the scope of this disclosure.

Figure 3A:
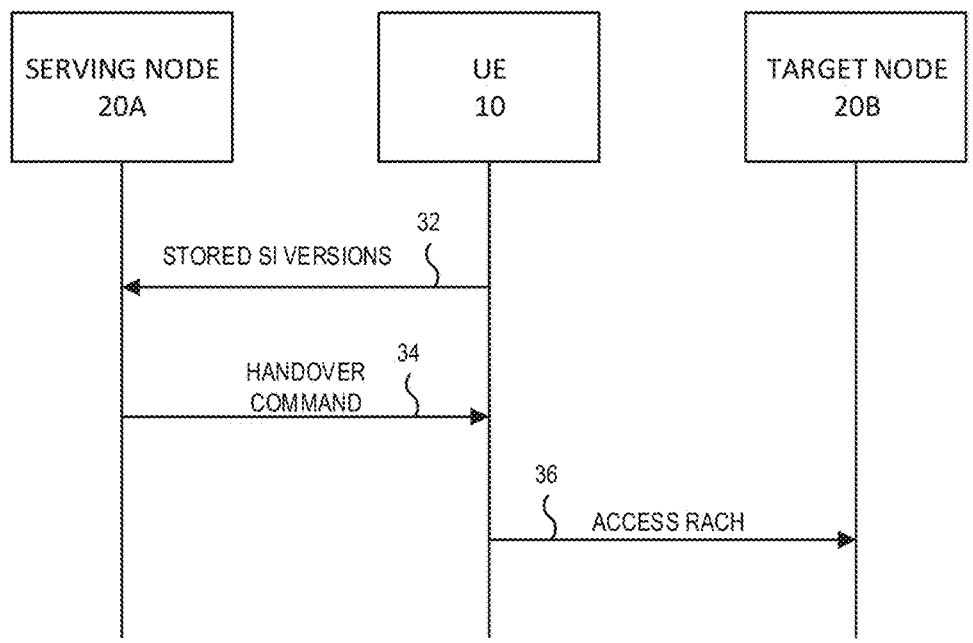
FIG. 3A illustrates message flows between a serving node, a target node and a wireless terminal in accordance with some embodiments.

Referring to FIG. 3A, in some embodiments, a UE 10 may inform the serving node 20A of its stored versions (or configurations) of system information (in particular, its stored common RACH configuration(s)), by means of a message 32 prior to receiving a handover command 34 from the serving node 20A. The handover command includes a value-tag associated with a system information configuration that the UE 10 can use to access a target cell served by the target node 20B. The UE 10 may then access the RACH of the target cell using the specified system information (arrow 36).

The UE 10 may have stored multiple system information blocks, such as MIBs and SIB's (e.g. SIB-1, . . . , SIB-K), and for each of these blocks the UE 10 has stored, the UE 10 may have one or multiple versions stored (which in practice are possible configurations) that are indexed by a number or index, referred to herein as a value-tag. The Common RACH configuration may be part of one of these blocks, hence, the UE 10 may have multiple RACH configurations, each associated to the value-tag.

Figure 3B:
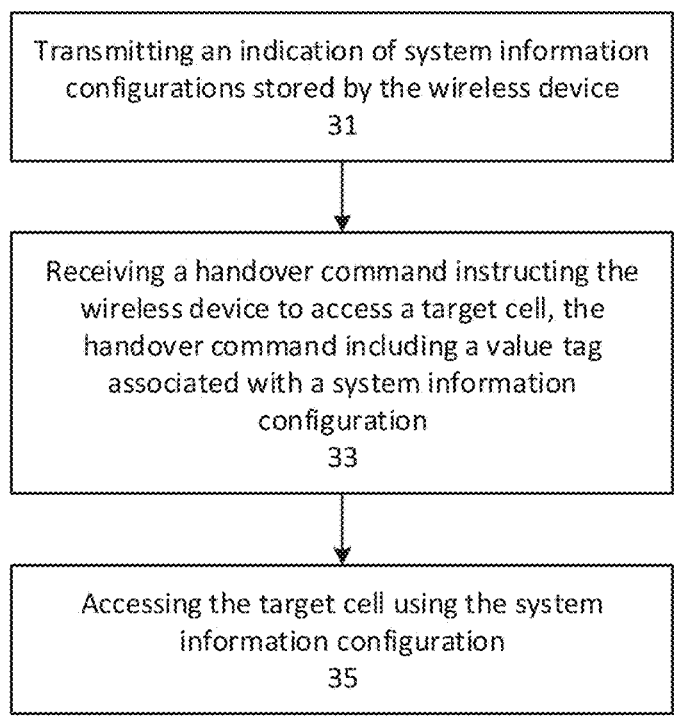
FIGS. 3B and 3C illustrate operations of a wireless terminal according to some embodiments.

Operations of a UE 10 according to some embodiments are illustrated in FIG. 3B. Referring to FIGS. 3A and 3B, the UE 10 transmits an indication 302 of system information configurations stored by the UE 10 to a serving node 20A (block 31). The UE 10 then receives a handover command 304 from the serving node 20A instructing the UE 10 to access a target cell served by a target node 20B (block 33). The handover command 304 includes an indication, such as by means of a value-tag, of the system information that the UE 10 should use to access the target cell. In response to the handover command 304, the UE 10 accesses the target cell (block 35) using the system information configuration specified in the handover command.

Figure 3C:
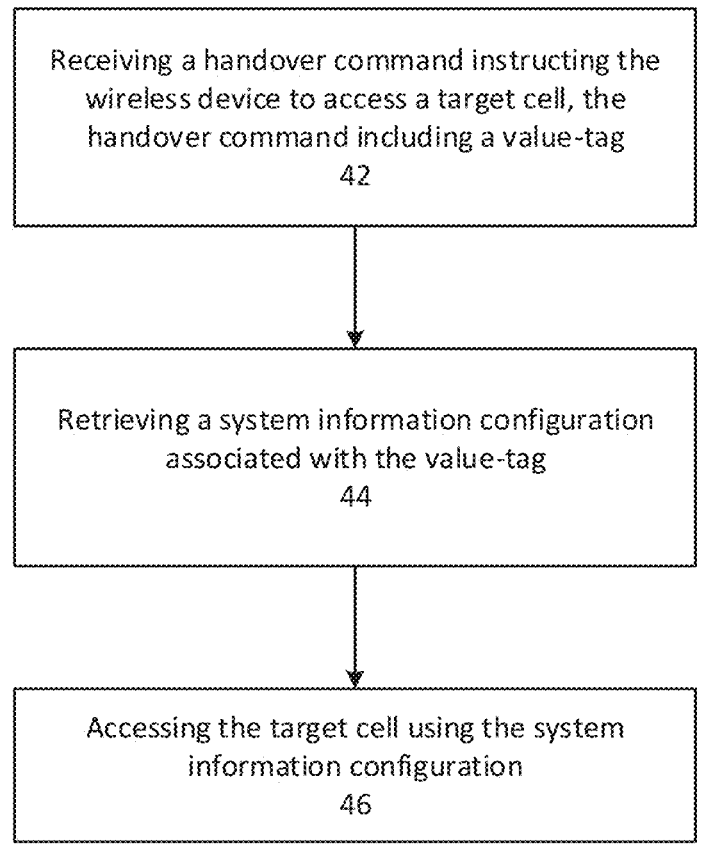

FIG. 3C illustrates further operations of a UE 10 according to some embodiments. Referring to FIGS. 3A and 3C, a UE 10 receives a handover command 304 from the serving node 20A instructing the UE 10 to access a target cell served by a target node 20B (block 42). The handover command 304 includes an indication, such as a value-tag, of the system information that the UE 10 should use to access the target cell. In response to the handover command 304, the UE 10 retrieves a system information configuration associated with the value-tag (block 44), and accesses the target cell (block 46) using the system information configuration specified in the handover command.

Each value-tag or set of value-tags associated to a given system information block (such as the one carrying a common RACH configuration) can be further associated to a cell. The UE 10 may also have stored system information blocks for multiple cells, hence, the UE 10 may have lists of multiple cells and for each cell the UE 10 may have a list of SIBs and for each SIB available set of configurations indexes by a value-tag. Example of tables the UE 10 are shown in Tables 1-3 below.

TABLE 1

Example of multiple versions of system information configurations indexed by a value-tag stored for a given cell (x1) for a set of SIBs and multiple value-tags.

| Stored SIB-2 configurations at the UE associated with Cell-x1 | SIB-2 (or NR-SIB1, or remaining minimum system information) |
|---|---|
| Value-tag = 5 | Specific list of parameters and values e.g. RACH configuration. |
| Value-tag = 4 | Specific list of parameters and values e.g. RACH configuration. |
| . . . | Specific list of parameters and values e.g. RACH configuration. |
| Value-tag = 8 | Specific list of parameters and values e.g. RACH configuration. |

TABLE 2

Example of multiple versions of system information configurations indexed by a value-tag stored for a given cell (x1) for a set of SIBs and multiple value-tags.

| Stored SIB-1 configurations at the UE associated with Cell-x1 | SIB-1 |
|---|---|
| Value-tag = 8 | Specific list of parameters and values. |
| Value-tag = 1 | Specific list of parameters and values. |
| . . . | Specific list of parameters and values. |
| Value-tag = 4 | Specific list of parameters and values. |

TABLE 3

Example of multiple versions of system information configurations indexed by a value-tag stored for a given cell (x2) for a set of SIBs and multiple value-tags.

| Stored SIB-2 configurations at the UE associated with Cell-x2 | SIB-2 (or NR-SIB1, or remaining minimum system information) |
|---|---|
| Value-tag = 5 | Specific list of parameters and values e.g. RACH configuration |
| Value-tag = 4 | Specific list of parameters and values e.g. RACH configuration |
| . . . | Specific list of parameters and values e.g. RACH configuration |
| Value-tag = 8 | Specific list of parameters and values e.g. RACH configuration |

Each value-tag or set of value-tags associated to a given system information block (such as the one carrying a common RACH configuration) can be further associated to an Area ID, which can be associated with multiple cells that share a set of system information configuration indexes identified by the value-tags. The UE 10 may also have stored system information blocks for a single Area ID, and in that case the system information blocks may be valid for multiple cells. In some embodiments, the UE 10 may have stored system information blocks for multiple Areas. Tables 4 to 6 provide examples of tables the UE may have stored.

TABLE 4

Example of multiple versions of system information indexed by a value-tag stored for one or multiple Areas for a set of SIBs and multiple value-tags.

| Stored SIB-2 configurations at the UE associated with Area ID-x1 | SIB-2 (or NR-SIB1, or remaining minimum system information) |
|---|---|
| Value-tag = 5 | Specific list of parameters and values e.g. RACH configuration |
| Value-tag = 4 | Specific list of parameters and values e.g. RACH configuration |
| . . . | Specific list of parameters and values e.g. RACH configuration |
| Value-tag = 8 | Specific list of parameters and values. |

TABLE 5

Example of multiple versions of system information indexed by a value-tag stored for one or multiple Areas for a set of SIBs and multiple value-tags.

| Stored SIB-1 configurations at the UE associated with Area ID-x1 | SIB-1 |
|---|---|
| Value-tag = 8 | Specific list of parameters and values. |
| Value-tag = 1 | Specific list of parameters and values. |
| . . . | Specific list of parameters and values. |
| Value-tag = 4 | Specific list of parameters and values. |

TABLE 6

Example of multiple versions of system information indexed by a value-tag stored for one or multiple Areas for a set of SIBs and multiple value-tags

| Stored SIB-2 configurations at the UE associated with Area-ID-x2 | SIB-2 (or NR-SIB1, or remaining minimum system information) |
|---|---|
| Value-tag = 5 | Specific list of parameters and values e.g. RACH configuration |
| Value-tag = 4 | Specific list of parameters and values e.g. RACH configuration |
| . . . | Specific list of parameters and values e.g. RACH configuration |
| Value-tag = 8 | Specific list of parameters and values e.g. RACH configuration |

The UE 10 can indicate to the network the availability of these stored system information versions and their indexes and/or associated cell and/or area (message 302 in FIG. 3A) in a number of ways. For example, in some embodiments, the UE 10 may indicate the availability of stored system information versions during a connection resume procedure (or equivalent, e.g. when an RRC Connection needs to be resumed or re-activated after suspension) where the UE sends in MSG.3 (e.g. RRC Connection Resume Request, or RRC Connection Re-Activation) and/or MSG.5 (e.g. RRC Connection Resume Complete or RRC Connection Re-activation complete). In some embodiments, only a subset of the stored information may be sent on MSG.3 while the remaining parts may be sent in MSG.5, or the full information may be sent in MSG.5 or in MSG.3, depending on the size of the uplink grant provided by the network.

In some embodiments, the UE 10 may indicate the availability of stored system information versions during an RRC Connection Setup procedure where the UE includes that information in MSG.5 (e.g. RRC Connection Setup Complete).

In some embodiments, the UE 10 may indicate the availability of stored system information versions by defining/utilizing a specific RRC procedure whereby the network can send a request to a UE, which can respond with the available system information configurations and their indices (e.g. value-tags) that are stored and the cell(s) and/or the system information and/or the area IDs they are associated to.

In some embodiments, the UE 10 may indicate the availability of stored system information versions by enhancing an RRC procedure, such as RRC Connection Resume, where the UE 10 can indicate in MSG.3 to the network that it has some stored system information also for other cells (e.g. for a potential cell for quick dual connectivity and/or carrier aggregation setup). The network may respond in MSG.4 that it wants the UE 10 to report that stored information and/or the indices (i.e. value-tags) for each cell and/or Area-ID and/or SIBs. The network may also request the UE 10 to indicate if that is for the same area ID as the cell the UE 10 is trying to resume to.

In some embodiments, the UE 10 may indicate the availability of stored system information versions by enhancing one or multiple RRC procedures, such as the RRC Measurement Configuration and/or the RRC Measurement Report. The UE 10 can receive, as part of the measurement configuration, an indication to include at least in the first transmitted measurement report (triggered and/or periodic) which system information configuration versions the UE 10 has stored (e.g. indicated by the value-tags). The information can be split in multiple reports in the case it is too large, where the amount of data can be configured and/or defined. That configuration can request the UE to include in measurement reports different level of information, such as all UE's stored value-tags for all cells and/or all SIBs and/or all Area IDs, and/or the UE's stored value-tags for specific cells and/or area ID(s) and/or SIBs. Information provided by the UE 10 can be also limited to the same area ID associated to the cell the UE is connected to and/or to a specific SIB, e.g. SIB-2, containing the RACH configuration.

In the case of triggered measurement reports, the UE 10 may only include the UE's 10 stored value-tags for the triggered cells. Configuration may also indicate for which SIBs the value-tags should be reported. In other words, the UE 10 may have for triggered cells many value-tags for many SIBs, but the network may only interested in SIB-2 (or other SIB containing the common RACH configuration) to facilitate the handover signalling.

If the UE 10 also sends measurement reports for non-triggered cells as part of the measurement reporting configuration, the UE 10 can also be configured to include the availability of stored system information and the value-tags.

In the case where a White Cell List has been configured, the UE 10 can only include the availability information/value-tags for the cells on the list. There can also be a specific cell list defined for requesting the UE 10 to indicate whether it has or not stored system information for these cells.

In some embodiments, a default configuration can be provided where the UE 10 simply includes one or multiple instances of the previously stored information, e.g. only for the same Area ID as the serving cell and only the SIB containing the RACH configuration.

In some embodiments, the UE 10 may indicate the availability of stored system information versions by enhancing an RRC procedure, such as Handover Complete message transmitted to the target cell after a handover. The UE 10 may include its stored system information in MSG.5 after handover execution. That can be done in the event that the serving node is not required to inform the system information/value-tags the UE has stored associated to cells other than the potential target cell during handover preparation.

Figure 4A:
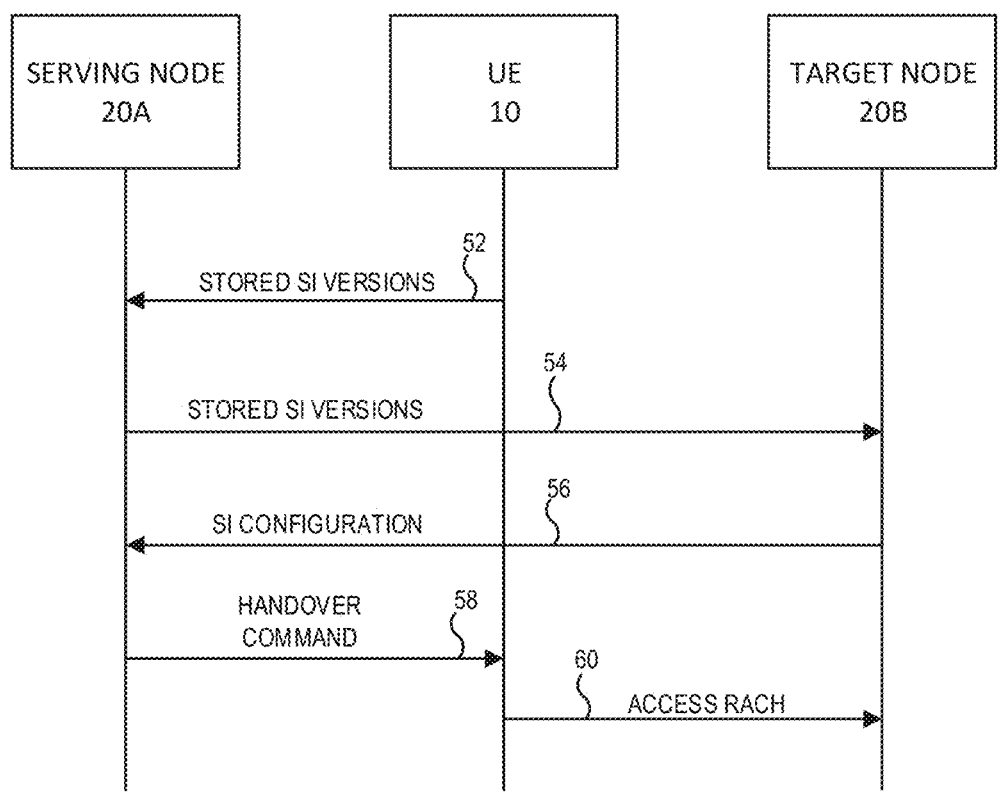
FIG. 4A illustrates message flows between a serving node, a target node and a wireless terminal in accordance with some embodiments.
Figure 4B:
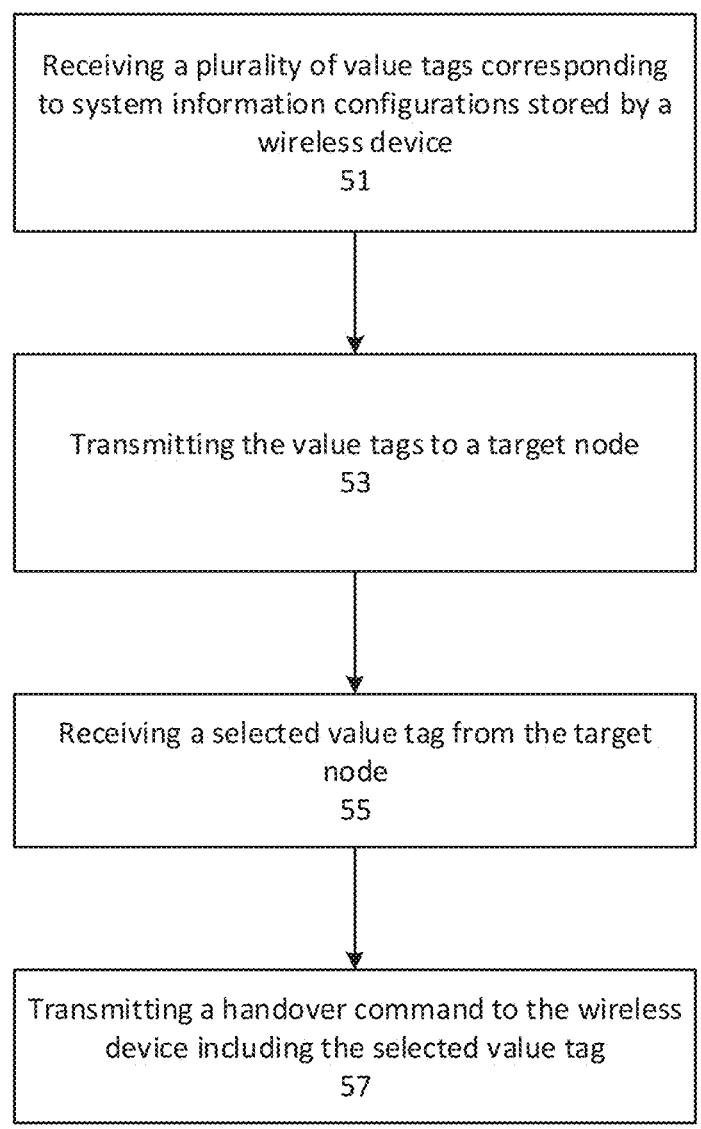
FIG. 4B illustrates operations of a serving node according to some embodiments.

In some embodiments, the serving node 20A can indicate to the target node 20B whether and which version(s) of stored system information an incoming UE 10 may have available. For example, referring to FIGS. 4A and 4B, a serving node 20A may receive an indication 52 from a UE 10 of the system information versions the UE 10 has stored (block 51). The serving node 20A may communicate this information to a target node 20B in a message 54 (block 53). The target node 20B then responds to the serving node 20A with a message 56 indicating which of the stored system information versions the UE 10 should use to access a target cell served by the target node 20B (block 55). The serving node 20A then sends a handover command 58 to the UE 10 instructing the UE 10 to access a target cell served by a target node 20B (block 57). The handover command 58 includes an indication, such as by means of a value-tag, of the system information that the UE 10 should use to access the target cell. In response to the handover command 58, the UE 10 accesses the target cell (arrow 60) using the system information configuration specified in the handover command.

The information included in the message 54 from the serving node 20A to the target node 20B about UE's stored value-tags may be depend on the different information the UE 10 may have provided to the serving node 20A. In some cases, the serving node 20A may include in the message 54 to the target node 20B only a subset of the information reported by the UE 10. The information can either be explicit or implicit. Various options are discussed below.

In some embodiments, the serving node 20A may include a list of value-tags the UE 10 has available for the target cell 20B for at least MIB, SIB-1 and SIB-2, or at least for the SIB where the common RACH configuration is transmitted. That can be the so called Remaining Minimum System Information.

In some embodiments, the serving node 20A may include includes lists of value-tags for multiple cells, where these multiple cells are known by the serving node 20A to belong to that same target node 20B, although only one of these is the one whose handover is being requested. That information can be later used by target node, for example, if the UE 10 has been handed over.

In some embodiments, the serving node 20A may include lists of value-tags for multiple cells, where these multiple cells are all cells reported by the UE 10.

In further embodiments, no information concerning available value-tags may be provided by the serving node 20A to the target node 20B, but only the system information from the serving node 20A may be provided so that the target node 20B can prepare a delta RRC Connection Reconfiguration with mobilityControlInfo command that includes differences between a current configuration and a new configuration the UE 10 can use to access the target node 20B.

In cases where the Area ID is employed, the information provided by the serving node 20A to the target node 20B may vary depending on whether the nodes belong to and/or are associated to the same or different Area IDs.

In some embodiments, the serving node 20A may include a list of value-tags the UE 10 has available and that are associated to a common Area ID that both the serving node 20A and the target node 20B have for at least MIB, SIB-1 and SIB-2 or at least for the SIB where the common RACH configuration is transmitted. Noe that instead of notifying its own source MIB and SIBs, a value-tag could also be used if the same Area ID is associated to both the serving node 20A and the target node 20B.

In some embodiments, the serving node 20A may include lists of value-tags for multiple Area IDs. That information can be later used by the target node 20B, for example, if the UE 10 has been handed over.

In further embodiments, assuming the UE 10 has not reported any stored information, and assuming the serving node 20A knows that the target node 20B shares the same Area ID as the serving node 20A, the serving node 20A can include only its own value-tag to indicate the currently used system information e.g. MIB, SIB-1 and SIB-2, in the message 54 to the target node 20B.

The information provided by the serving node 20A to the target node 20B in the message 54 can be encoded in a transparent RRC container. For example, the information provided in the message 54 can be part of an RRC container (HandoverPreparationInformation message) defined in the RRC specifications and prepared by the serving node 20A.

In particular, the information can provided as part of the Access Stratum Configuration (as-Config) information element included so the target node 20B can prepare the handover command (i.e. RRC Connection Reconfiguration with mobilityControlInfo) to be provided to the UE 10. Some examples of such an arrangement are provided below. A portion of a HandoverPreparationInformation message including an as-Config information element is shown in Table 7:

TABLE 7

Handover Preparation Message
- HandoverPreparationInformation message

- -- ASN1START
-
...
-
- HandoverPreparationInformation-r8-1Es ::= SEQUENCE {
-   ue-RadioAccessCapabilityInfo    UE-CapabilityRAT-ContainerList,
-   as-Config    as-Config
    OPTIONAL,    -- Cond HO
-   mm-Config    RRM-Config
    OPTIONAL,
-   as-Context    AS-Context
    OPTIONAL,    -- Cond HO
-   nonCriticalExtension
    HandoverPreparationInformation-v920-IEs
    OPTIONAL
- } ...

Table 8 shows portions of a conventional as-Config IE from LTE.

TABLE 8

Conventional as-Config Information Element
as-Config information element

-- ASN1START
as-Config ::=    SEQUENCE {
  sourceMeasConfig    MeasConfig,
  sourceRadioResourceConfig
  RadioResourceConfigDedicated,
  sourceSecurityAlgorithmConfig    SecurityAlgorithmConfig,
  sourceUE-Identity    C-RNTI,

TABLE 8-continued

Conventional as-Config Information Element
as-Config information element

```
  sourceMasterInformationBlock        MasterInformationBlock,
  sourceSystemInformationBlockType1
  SystemInformationBlockType1(WITH COMPONENTS
                                                        {...,
nonCriticalExtension ABSENT}),
  sourceSystemInformationBlockType2   SystemInformationBlockType2,
  antennaInfoCommon                       AntennaInfoCommon,
  sourceDI-CarrierFreq                    ARFCN-ValueEUTRA,
...
-- ASN1STOP
```

Table 9 shows a modified BI IE according to some embodiments. As shown in Table 9, the as-Config IE is modified to include a SystemInformationValueTagList containing system information value-tags.

TABLE 9

Modified as-Config Information Element
as-Config information element

```
-- ASN1START
as-Config ::=          SEQUENCE {
  sourceMeasConfig                     MeasConfig,
  sourceRadioResourceConfig
  RadioResourceConfigDedicated,
  sourceSecurityAlgorithmConfig        SecurityAlgorithmConfig,
  sourceUE-Identity                    C-RNTI,
  sourceMasterInformationBlock         MasterInformationBlock,
  sourceSystemInformationBlockType1
  SystemInformationBlockType1(WITH COMPONENTS
                                                        {...,
nonCriticalExtension ABSENT}),
  sourceUEValueTagList
  SystemInformationValueTagList,
  sourceSystemInformationBlockType2    SystemInformationBlockType2,
  antennaInfoCommon                       AntennaInfoCommon,
  sourceDI-CarrierFreq                    ARFCN-ValueEUTRA,
  ...
}
SystemInformationValueTagList ::= SEQUENCE (SIZE
   (1..maxValueTags)) OF SystemInformationValueTag
-- ASN1 STOP
```

Table 10 shows a modified as-Config IE according to some embodiments. As shown in Table 10, the as-Config IE is modified to include a sourceValueTagsTargetGnodeB-Cells element containing system information value-tags.

TABLE 10

Modified as-Config Information Element
as-Config information element

```
-- ASN1START
as-Config ::=          SEQUENCE {
  sourceMeasConfig                     MeasConfig,
  sourceRadioResourceConfig
  RadioResourceConfigDedicated,
  sourceSecurityAlgorithmConfig        SecurityAlgorithmConfig,
  sourceUE-Identity                    C-RNTI,
  sourceMasterInformationBlock         MasterInformationBlock,
  sourceSystemInformationBlockType1
  SystemInformationBlockType1(WITH COMPONENTS
                                                        {...,
nonCriticalExtension ABSENT}),
  sourceValueTagsTargetGnodeBCells
  sourceSystemInformationBlockType2    SystemInformationBlockType2,
  antennaInfoCommon                       AntennaInfoCommon,
  sourceDI-CarrierFreq                    ARFCN-ValueEUTRA,
...
-- ASN1STOP
```

Table 11 shows a modified as-Config IE according to some embodiments. As shown in Table 11, the as-Config IE is modified to include a sourceListValueTagsAllAvailableCells element containing system information value-tags.

TABLE 11

Modified as-Config Information Element
as-Config information element

```
-- ASN1START
as-Config ::=          SEQUENCE {
  sourceMeasConfig                     MeasConfig,
  sourceRadioResourceConfig
  RadioResourceConfigDedicated,
  sourceSecurityAlgorithmConfig        SecurityAlgorithmConfig,
  sourceUE-Identity                    C-RNTI,
  sourceMasterInformationBlock         MasterInformationBlock,
  sourceSystemInformationBlockType1
  SystemInformationBlockType1(WITH COMPONENTS
                                                        {...,
nonCriticalExtension ABSENT}),
  sourceListValueTagsAllAvailableCells
  sourceSystemInformationBlockType2    SystemInformationBlockType2,
  antennaInfoCommon                       AntennaInfoCommon,
  sourceDI-CarrierFreq                    ARFCN-ValueEUTRA,
...
-- ASN1STOP
```

Table 12 shows a modified as-Config IE using Area IDs according to some embodiments. As shown in Table 12, the as-Config IE is modified to include a sourceListValueTagsAllAvailableAreaIDs element containing system information value-tags.

TABLE 12

Modified as-Config Information Element
as-Config information element

```
-- ASN1START
as-Config ::=          SEQUENCE {
  sourceMeasConfig                     MeasConfig,
  sourceRadioResourceConfig
  RadioResourceConfigDedicated,
  sourceSecurityAlgorithmConfig        SecurityAlgorithmConfig,
  sourceUE-Identity                    C-RNTI,
  sourceMasterInformationBlock         MasterInformationBlock,
  sourceSystemInformationBlockType1
  SystemInformationBlockType1(WITH COMPONENTS
                                                        {...,
nonCriticalExtension ABSENT}),
  sourceListValueTagsAllAvailableAreaIDs
  sourceSystemInformationBlockType2    SystemInformationBlockType2,
  antennaInfoCommon                       AntennaInfoCommon,
  sourceDI-CarrierFreq                    ARFCN-ValueEUTRA,
...
-- ASN1STOP
```

The RRC transparent container transmitted from the serving node 20A to the target node 20B can be an information element in an Xn application protocol, as part of the handover request message or any other inter-node interface.

Figure 5A:
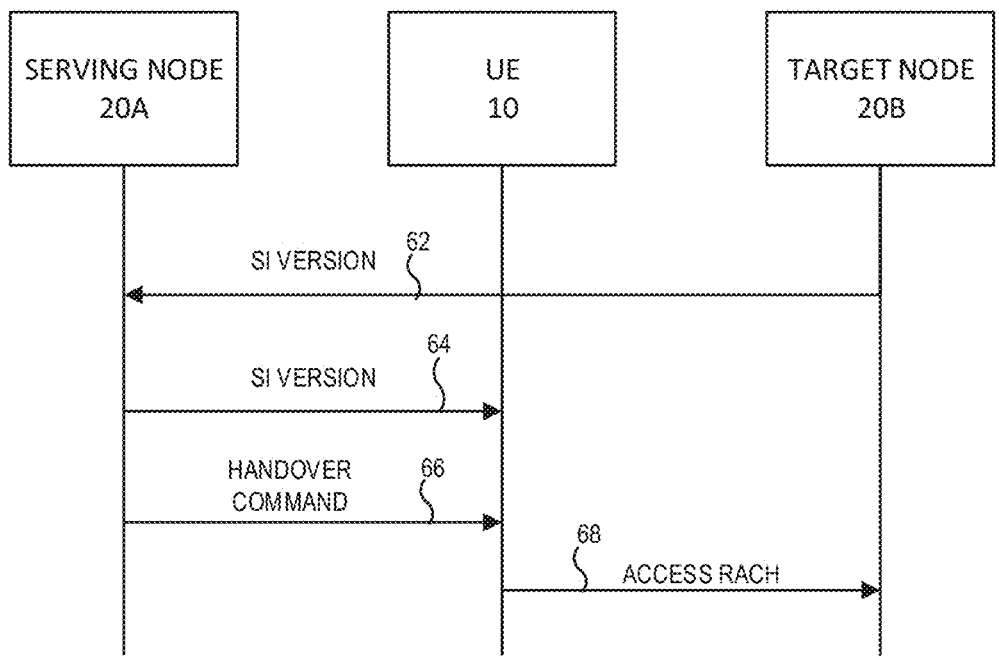
FIG. 5A illustrates message flows between a serving node, a target node and a wireless terminal in accordance with some embodiments.

Referring to FIG. 5A, the serving node 20A may indicate to a UE 10 which version of system information stored at the UE 10 should be used to access the target node 20B during a handover. The target node 20B may indicate which version of system information should be used in a message 62 to the serving node 20A. The serving node 20A may then indicate to a UE 10 which version of system information stored at the UE 10 should be used to access the target node 20B during a handover in a message 64. This information may be provided to the UE 10 in a number of ways. For example, in some embodiments, depending on the information included in the RRC container provided by the serving node 20A, the target node 20B can include different information in the RRC Connection Reconfiguration with mobilityControlInfo request. The source node 10A then transmits a handover command 66 to the UE 10 referencing the system information previously provided by the serving node 20A. The UE 10 can then access the target node (arrow 68).

Figure 5B:
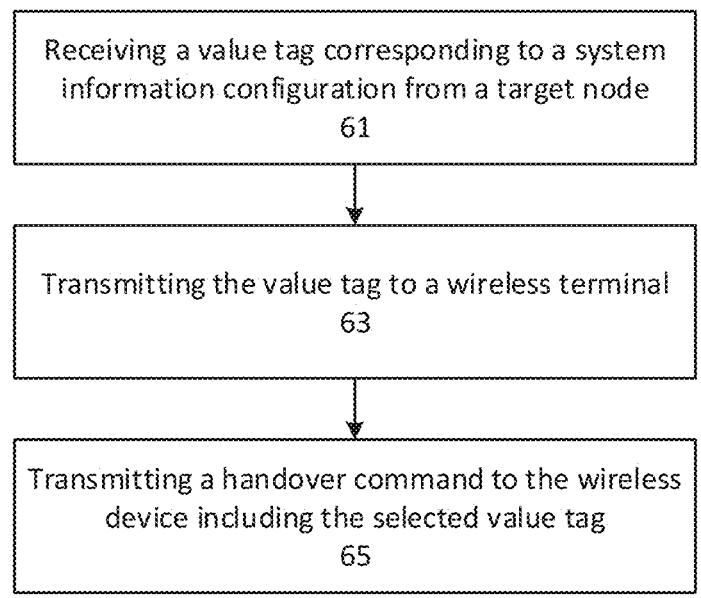
FIG. 5B illustrates operations of a serving node according to some embodiments.

Referring to FIG. 5B, operations of a serving node 20A are illustrated. In particular, the serving node 20A receives a value-tag corresponding to a system information configuration that can be used to access a target node (block 61). The serving node 20A then transmits the value-tag to the UE 10 (block 63), and then transmits a handover command to the UE including the selected value-tag (block 65).

If the target cell for the UE 10 is using and/or broadcasting a system information associated to one of the value-tags indicated by the serving node 20A as being stored at the incoming UE 10, the target node 20B can indicate in an RRC container to be provided to the incoming UE 10 the value-tag associated to the configuration to be used, in particular the common RACH configuration for the target cell.

If the target cell for the incoming UE 10 is not using and/or broadcasting a system information associated to any of the value-tags indicated by the serving node 20A as being stored at the incoming UE 10, the target node 20B may include in the RRC container the system information configuration (and possibly a new value-tag) used by the serving node 20A, to be provided to the incoming UE 10 so that the received system information configuration should be used when accessing the target node 20B.

If the target cell for the UE 10 is not using and/or broadcasting a system information configuration associated to any of the value-tags indicated by the serving node 20A as stored at the UE 10, the serving node 20A may include the system information used at the serving node (and possibly a new value-tag) to be provided to the incoming UE 10 so that the received configuration should be used when accessing the target cell.

In addition, the target node 20A may also include dedicated RACH configuration for CSI-RS resources (either previously configured or also included in that configuration) and/or dedicated RACH configuration for SS Blocks.

The selected system information can be provided to the UE in a number of ways. For example, in the case of the common RACH configuration, the target node may include the indication to the UE to use one of the available value-tags in the mobilityControlInfo IE, as shown below. Table 13 shows a conventional MobilityControlInfo IE from LTE, while Table 14 shows a MobilityControlInfo IE including a valueTagTargetAccess IE according to some embodiments.

TABLE 13 conventional LTE MobilityControlInfo IE

MobilityControlInfo ::=   SEQUENCE {
  targetPhysCellId          PhysCellId,
  carrierFreq                     CarrierFreqEUTRA
        OPTIONAL,       -- Cond HO-toEUTRA2
  carrierBandwidth                 CarrierBandwidthEUTRA
        OPTIONAL,       -- Cond HO-toEUTRA
  additionalSpectrumEmission      AdditionalSpectrumEmission
  OPTIONAL,        -- Cond HO-toEUTRA
  t304                            ENUMERATED {
                                                       ms50, ms100,
ms150, ms200, ms500, ms1000,
                                                       ms2000,
ms10000-v1310},
  newUE-Identity          C-RNTI,
  radioResourceConfigCommon TABLE 13-continued conventional LTE MobilityControlInfo IE RadioResourceConfigCommon,
  rach-Config Dedicated           RACH-ConfigDedicated
        OPTIONAL,       --
...
-- ASN1STOP

EXAMPLE 1

TABLE 14 conventional LTE MobilityControlInfo IE

Figure 6A:
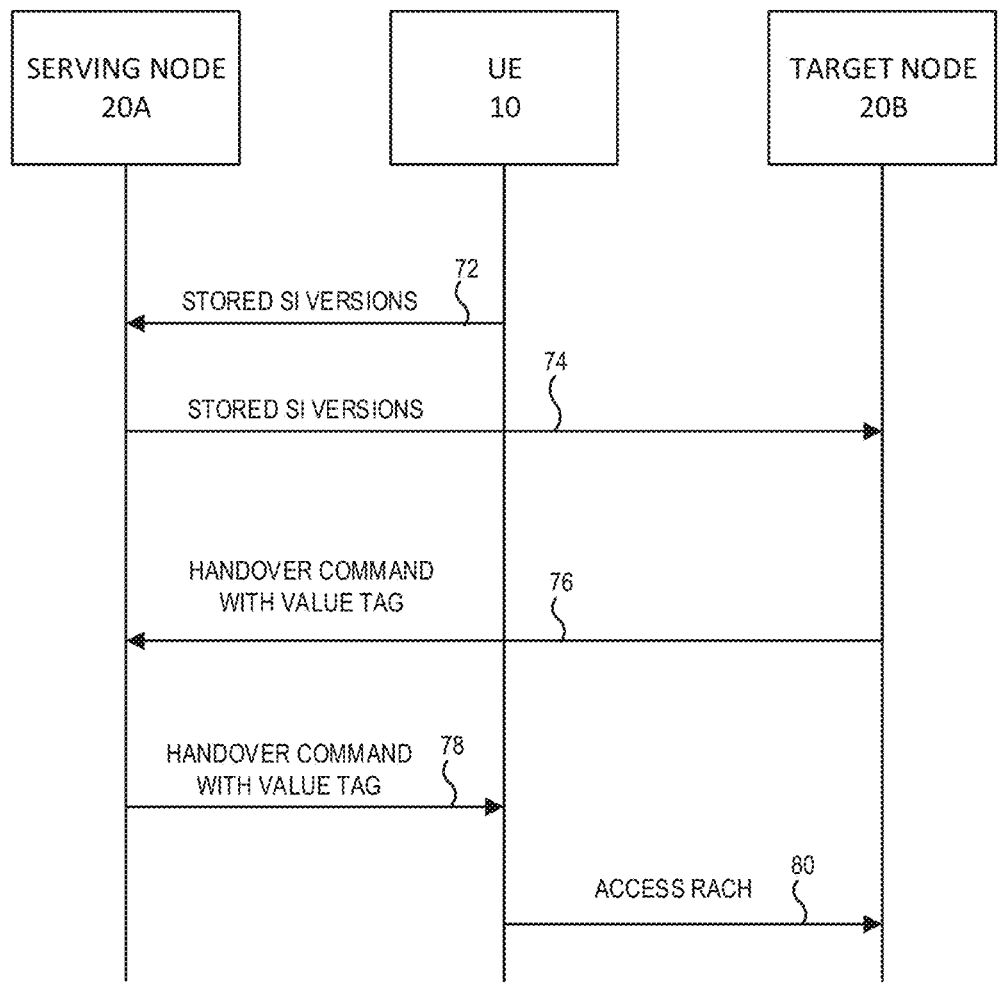
FIG. 6A illustrates message flows between a serving node, a target node and a wireless terminal in accordance with some embodiments.
Figure 6B:
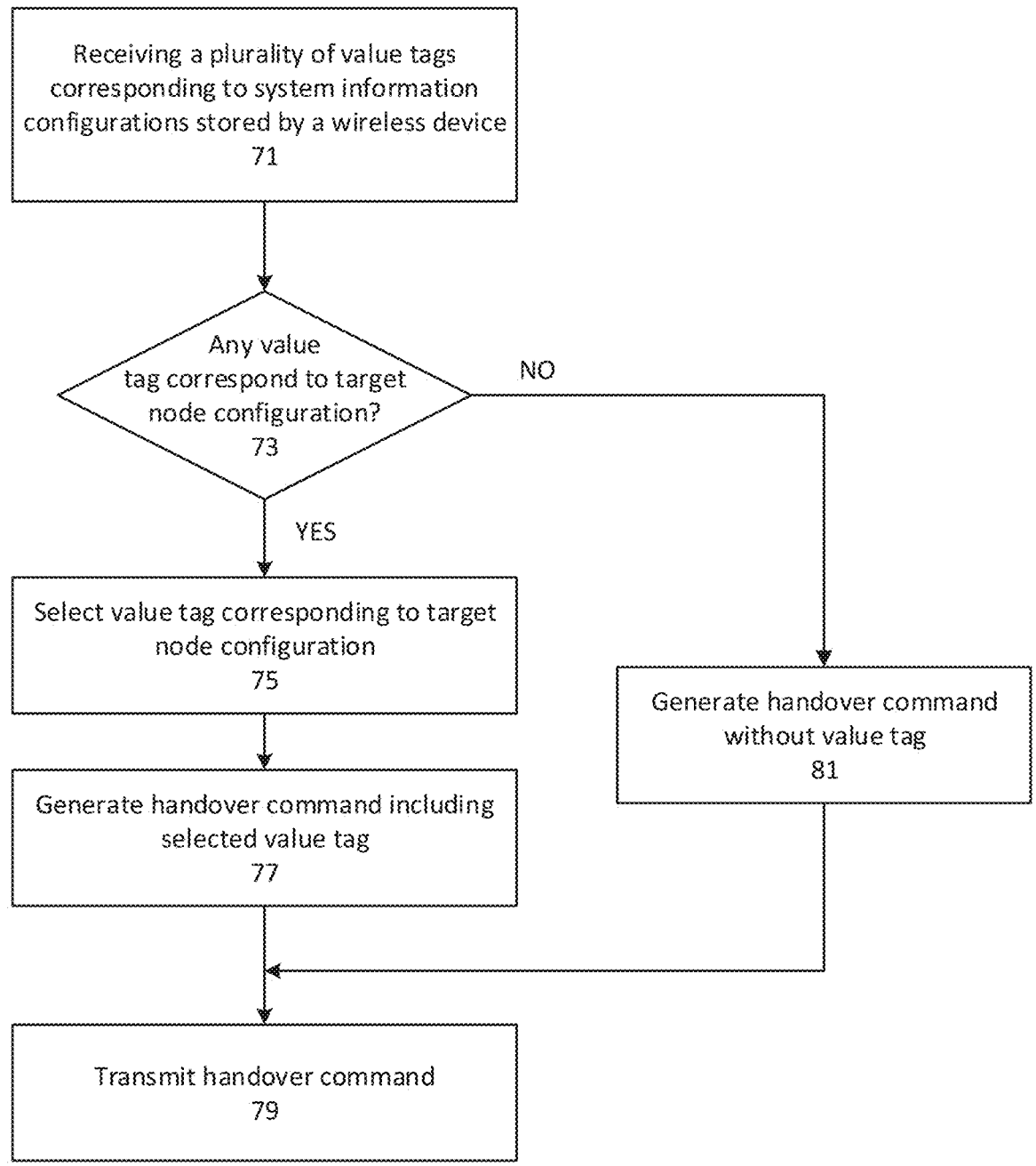
FIG. 6B illustrates operations of a target node according to some embodiments.

MobilityControlInfo ::=   SEQUENCE {
  targetPhysCellId          PhysCellId,
  carrierFreq                     CarrierFreqEUTRA
        OPTIONAL,       -- Cond HO-toEUTRA2
  carrierBandwidth                 CarrierBandwidthEUTRA
        OPTIONAL,       -- Cond HO-toEUTRA
  additionalSpectrumEmission      AdditionalSpectrumEmission
  OPTIONAL,        -- Cond HO-toEUTRA
  t304                            ENUMERATED {
                                                       ms50, ms100,
ms150, ms200, ms500, ms1000,
                                                       ms2000,
ms10000-v1310},
  newUE-Identity          C-RNTI,
  valueTagTargetAccess
  rach-Config Dedicated           RACH-ConfigDedicated
        OPTIONAL,       --
...
-- ASN1STOP Referring to FIGS. 6A and 6B, in some embodiments, the target node 20B may prepare a handover command that indicates a value-tag associated to a system information configuration that can be used to access the target node 20B and transmit the handover command to the source node, for example in a transparent RRC container. As shown in FIG. 6A, a UE 10 may provide an indication in a message 72 to the serving node 20A of the system information versions stored at the UE 10, and in response, the serving node 20A may send a message 74 informing the target node 20B of the system information versions stored at the UE 10. The target node 20B may prepare a handover command including a value-tag associated to one of the stored system information versions provided by the serving node 20A, and transmit the handover command including the value-tag to the serving node 20A in a message 76, for example, in a transparent RRC container. The serving node 20A may then transmit the handover command provided by the target node 20B to the UE 10 in a message 78, instructing the UE 10 to access the target node 20B, such as by accessing the RACH of the target node 20B (arrow 80).

Operations of a target node 20B according to some embodiments are illustrated in FIG. 6B. Referring to FIG. 6B, a target node 20B may receive, from a serving node 20A, a plurality of value-tags, each of the plurality of value-tags corresponding to a respective system information configuration stored by a UE 10 served by the serving node (block 71). The target node 20B may determine whether any of the plurality of value-tags correspond to a system information configuration that can be used by the UE 10 to access the target cell (block 73). If at least one of the plurality of value-tags corresponds to a system information configuration that can be used by the UE 10 to access the target cell, the target node 20B selects a value-tag from the plurality of value-tags, wherein the selected value-tag corresponds to a system information configuration that can be used to access the target cell (block 75), generates a handover command including the selected value-tag (block 77) and then transmits a handover command instructing the UE 10 to access the target cell (block 79). The handover command can be transmitted to the serving node 20A. If no value-tag corresponds to the target node configuration, the target node 20B may generate a conventional handover command without a value-tag (block 81) prior to transmitting the handover command at block 79.

The UE 10 may take a number of actions upon receiving the indication of the system information version to access the target cell. In some embodiments, the UE 10 receives a handover command prepared by the target node 20B and forwarded by the serving node 20A containing the information enabling the UE 10 to access the target node 20B and indicating which system information version, among those stored by the UE 10, to use to access a target cell served by the target node 20B, in particular, which common RACH configuration to use. When the target cell has a multi-beam configuration, there can be part(s) of the common RACH configuration association associated to the downlink beam that the UE selects, for example, based on the SS Block for the target cell.

If the UE 10 receives a mobilityControlInfo IE and identifies the absence of a common RACH configuration therein, the UE 10 can assume the same common RACH configuration used in the serving cell. That can be an implicit indication that both cells belong to the same area and, for that particular SIB (or equivalent system information block) carrying the common RACH configuration, the same version, indicated by the value-tags, are being used by both cells.

If the UE 10 receives in a mobilityControlInfo IE a full common RACH configuration, the UE 10 may apply that information to access the target cell. That can be an indication from the target node 20B that either the UE 10 does not have stored the value-tag associated to that configuration or the serving node 20A did not forward it to the target node 20B, or that the two nodes belong to different Area IDs so the meaning of the value-tags cannot be interpreted.

If the mobilityControlInfo IE including the full common RACH configuration also includes a new value-tag, the UE 10 can store the new value-tag associated to the full common RACH configuration received in the mobilityControlInfo IE along with the common RACH configuration, now associated to that cell and/or Area ID. That can be an indication from target that either the UE 10 does not have stored the value-tag associated to that configuration or the serving node 20A did not forward it to the target node 20B. Since the target included a value-tag in the mobilityControlInfo IE, that can be an indication that both nodes belong to the same Area ID.

If the UE 10 receives in a mobilityControlInfo IE a value-tag for the common RACH configuration (or SIB containing it) and, in addition, a delta RACH configuration, indicating beams in the target that are not allowed to be accessed, the UE 10 may apply the common RACH configuration to then follow the rules indicated by the beams not allowed to be accessed, despite the availability of RACH configurations. The UE 10 may also receive, in addition to the value-tag that indicates the common RACH resource, information about preferred beams to access and the UE 10 may act according to the rules defined in the standard, regardless of how the UE 10 obtained the common RACH configuration, in the case of this embodiment, via the value-tag and stored system information.

If the UE receives, in addition to the value-tag enabling the UE 10 to apply common RACH resources, dedicated RACH resources associated to SS blocks and/or CSI-RS resources to RACH mapping, the UE 10 should follow the rules defined in the applicable specifications for the usage of common or dedicated RACH resources.

EMBODIMENTS

Embodiment 1

A method of operating a wireless device in a wireless communication network, wherein the wireless device is served by a serving node in the wireless communication network, the method comprising: transmitting, to the serving node, an indication of system information configurations stored by the wireless device, wherein the indication of system information configurations comprises a plurality of value-tags, each of the plurality of value-tags corresponding to a respective system information configuration stored by the wireless device; receiving, from the serving node, a handover command instructing the wireless device to access a target cell in the wireless communication network, wherein the handover command indicates a selected one of the plurality of value-tags corresponding to the target cell; and accessing the target cell using a selected system information configuration corresponding to the selected one of the plurality of value-tags.

Embodiment 2

The method according to Embodiment 1, wherein each of the plurality of value-tags corresponds to a cell in the wireless communication network.

Embodiment 3

The method according to Embodiment 1, wherein each of the plurality of value-tags corresponds to a group of cells in the wireless communication network, and wherein the selected one of the plurality of value-tags corresponds to a selected group of cells including the target cell.

Embodiment 4

The method according to Embodiment 3, wherein each of the plurality of value-tags corresponds to an area identifier that corresponds to an associated group of cells in the wireless communication network.

Embodiment 5

The method according to any previous Embodiment, wherein the system information configurations comprise system information blocks, SIBs, that include parameters for accessing a corresponding target cell in the communication network.

Embodiment 6

The method according to Embodiment 5, wherein the parameters for accessing the corresponding target cell comprise common random access channel, RACH, configurations.

Embodiment 7 the method according to any of Embodiments 1-4, wherein the system information configurations comprise master information blocks, MIBs, that include parameters for accessing a corresponding target cell in the communication network.

Embodiment 8

The method according to any previous Embodiment, wherein transmitting the indication of system information configurations stored by the wireless device to the serving node comprises:
transmitting the indication of system information configurations stored by the wireless device during a connection resume procedure.

Embodiment 9

The method according to Embodiment 8, wherein the connection resume procedure comprises a radio resource control, RRC, Connection Resume request, an RRC Connection Reactivation message, an RRC Connection Resume Complete message, or an RRC Connection Reactivation Complete message.

Embodiment 10

The method according to any of Embodiments 1-7, wherein transmitting the indication of system information configurations stored by the wireless device to the serving node comprises: transmitting the indication of system information configurations stored by the wireless device during a connection setup procedure.

Embodiment 11

The method according to any of Embodiments 1-7, wherein transmitting the indication of system information configurations stored by the wireless device to the serving node comprises: transmitting the indication of system information configurations stored by the wireless device with a radio resource control, RRC, measurement report.

Embodiment 12

The method according to any of Embodiments 1-7, wherein transmitting the indication of system information configurations stored by the wireless device to the serving node comprises: transmitting the indication of system information configurations stored by the wireless device with a radio resource control, RRC, Handover complete.

Embodiment 13

A method of operating a wireless device in a wireless communication network, wherein the wireless device is served by a serving node in the wireless communication network, the method comprising: receiving, from the serving node, a handover command instructing the wireless device to access a target cell in the wireless communication network, wherein the handover command indicates a value-tag; retrieving a selected system information configuration corresponding to the value-tag from a plurality of system information configurations stored at the wireless device, each of the plurality of system information configurations being associated with a corresponding value-tag; and accessing the target cell using a selected system information configuration.

Embodiment 14

The method according to Embodiment 13, wherein each value-tag corresponds to a cell in the wireless communication network, and wherein the selected system information configuration corresponds to the target cell.

Embodiment 15

The method according to Embodiment 13, wherein each value-tag corresponds to a group of cells in the wireless communication network, and wherein the selected system information configuration corresponds to a selected group of cells including the target cell.

Embodiment 16

The method according to Embodiment 15, wherein each value-tag corresponds to an area identifier that corresponds to an associated group of cells in the wireless communication network.

Embodiment 17

The method according to any of Embodiments 13 to 16, wherein the system information configurations comprise system information blocks, SIBs, that include parameters for accessing a corresponding target cell in the communication network.

Embodiment 18

The method according to Embodiment 17, wherein the parameters for accessing the corresponding target cell comprise common random access channel, RACH, configurations.

Embodiment 19

The method according to any of Embodiments 13 to 16, wherein the system information configurations comprise master information blocks, MIBs, that include parameters for accessing a corresponding target cell in the communication network.

Embodiment 20

A method of operating a serving node in a wireless communication network, wherein the serving node serves a wireless device in a serving cell in the wireless communication network, the method comprising: receiving, at the serving node, a plurality of value-tags, each of the plurality of value-tags corresponding to a respective system information configuration stored by the wireless device; transmitting the plurality of value-tags to a target node; receiving, from the target node, a selected value-tag from the plurality of value-tags for use in accessing a target cell served by the target node; and transmitting, to the wireless device, a handover command instructing the wireless device to access the target cell, wherein the handover command indicates the selected value-tag to enable the wireless device to access the target cell using the respective stored system information configuration corresponding to the selected value-tag.

Embodiment 21

The method according to Embodiment 20, wherein the plurality of value-tags is provided to the target node in a transparent radio resource control, RRC, container.

Embodiment 22

The method according to Embodiment 20, wherein the plurality of value-tags is provided to the target node in a Handover Preparation Message.

Embodiment 23

The method according to Embodiment 20, wherein the plurality of value-tags is provided to the target node in an as-Config information element.

Embodiment 24

The method according to any of Embodiments 20 to 23, wherein the plurality of value-tags correspond to system information configurations for a plurality of cells served by the target node, the plurality of cells including the target cell.

Embodiment 25

The method according to any of Embodiments 20 to 23, wherein the plurality of value-tags correspond to system information configurations for a plurality of cells, the plurality of cells including cells served by the target node and cells not served by the target node.

Embodiment 26

The method according to any of Embodiments 20 to 25, wherein the plurality of value-tags comprise value-tags associated with an area identifier to which the target node belongs.

Embodiment 27

The method according to any of Embodiments 20 to 25, wherein the plurality of value-tags comprise value-tags associated with a plurality of area identifiers including an area identifier to which the target node belongs.

Embodiment 28

A method of operating target node in a wireless communication network, wherein the target node serves a target cell in the wireless communication network, the method comprising: receiving, from a serving node, a plurality of value-tags, each of the plurality of value-tags corresponding to a respective system information configuration stored by a wireless device served by the serving node; determining whether any of the plurality of value-tags correspond to a system information configuration that can be used by the wireless device to access the target cell; in response to determining that at least one of the plurality of value-tags correspond to a system information configuration that can be used by the wireless device to access the target cell, selecting a value-tag from the plurality of value-tags, wherein the selected value-tag corresponds to a system information configuration that can be used to access the target cell; and transmitting a handover command instructing the wireless device to access the target cell.

Embodiment 29

The method according to Embodiment 28, wherein the handover command indicates the selected value-tag to enable the wireless device to access the target cell using the system information configuration corresponding to the selected value-tag.

Embodiment 30

The method according to Embodiment 28, further comprising: in response to determining that none of the plurality of value-tags correspond to a system information configuration that can be used by the wireless device to access the target cell, including system information for accessing the target cell in the handover command.

Embodiment 31

A method according to any of Embodiments 28 to 30, wherein transmitting the handover command to the wireless device comprises transmitting the handover command to the serving node in a transparent radio resource control, RRC, container.

Embodiment 32

A wireless device, wherein the wireless device is adapted to perform according to any of Embodiments 1 to 19.

Embodiment 33

A wireless device comprising: a transceiver configured to provide wireless network communication with a wireless communication network; and processing circuitry coupled to the transceiver, wherein the processing circuitry is configured to provide wireless network communication through the transceiver, and wherein the processing circuitry is configured to perform operations according to any of Embodiments 1 to 19.

Embodiment 34

A network node, wherein the network node is adapted to perform according to any of Embodiments 20 to 31.

Embodiment 35

A network node comprising: a transceiver configured to provide wireless network communication with a wireless communication network; and processing circuitry coupled to the transceiver, wherein the processing circuitry is configured to provide wireless network communication through the transceiver, and wherein the processing circuitry is configured to perform operations according to any of Embodiments 20 to 31.

Additional Description and Embodiments

Figure 7:
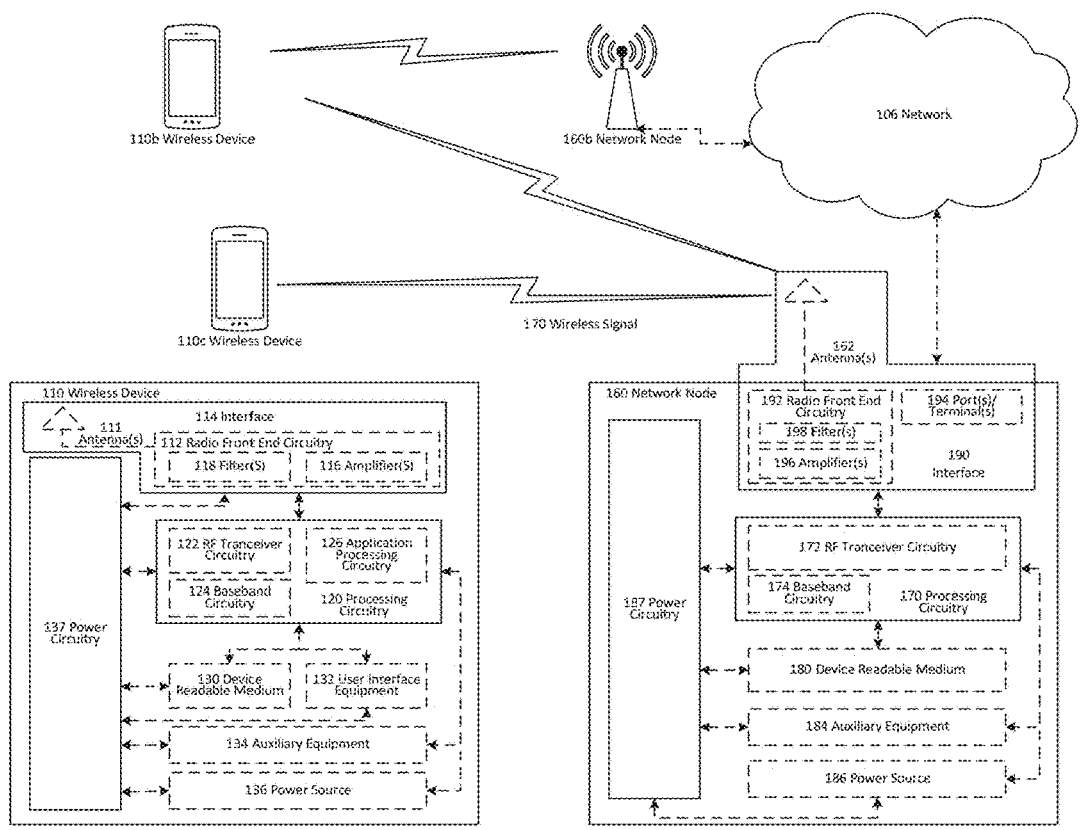
FIG. 7 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 160 includes processing circuitry 170, device readable medium 180, interface 190, auxiliary equipment 184, power source 186, power circuitry 187, and antenna 162. Although network node 160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 7 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 8:
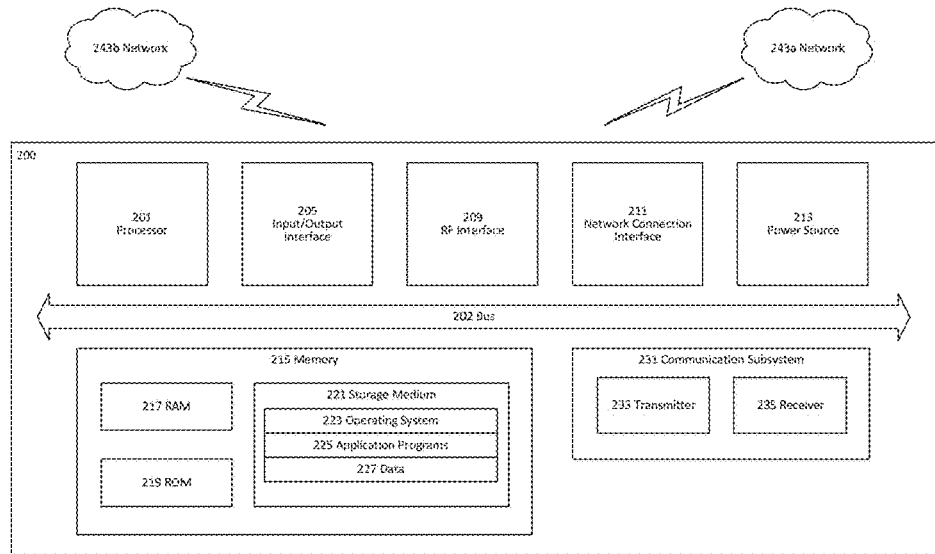
FIG. 8 illustrates a user equipment in accordance with some embodiments.

FIG. 2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3rd Generation Partnership Project (3GPP), including a NB-IoT UE that is not intended for sale to, or operation by, a human user. UE 200, as illustrated in FIG. 8, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 8, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

FIG. 3 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

Figure 9:
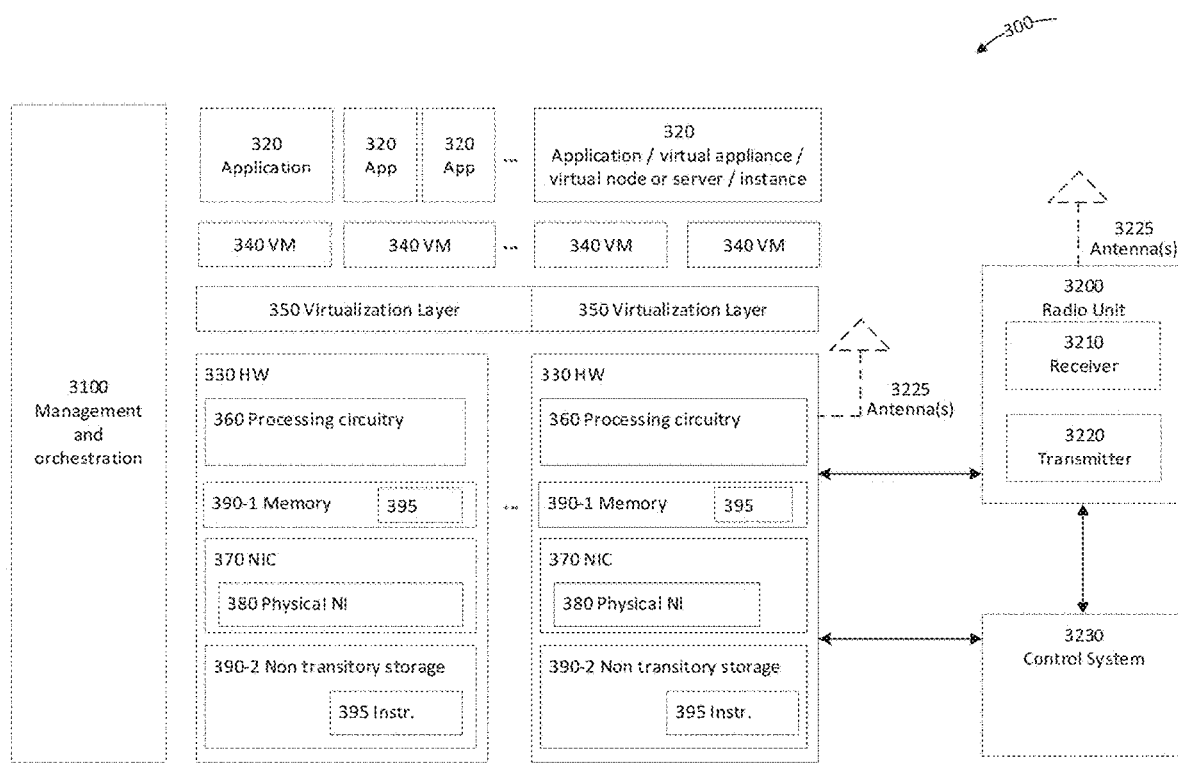
FIG. 9 illustrates a virtualization environment in accordance with some embodiments.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 9.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 10:
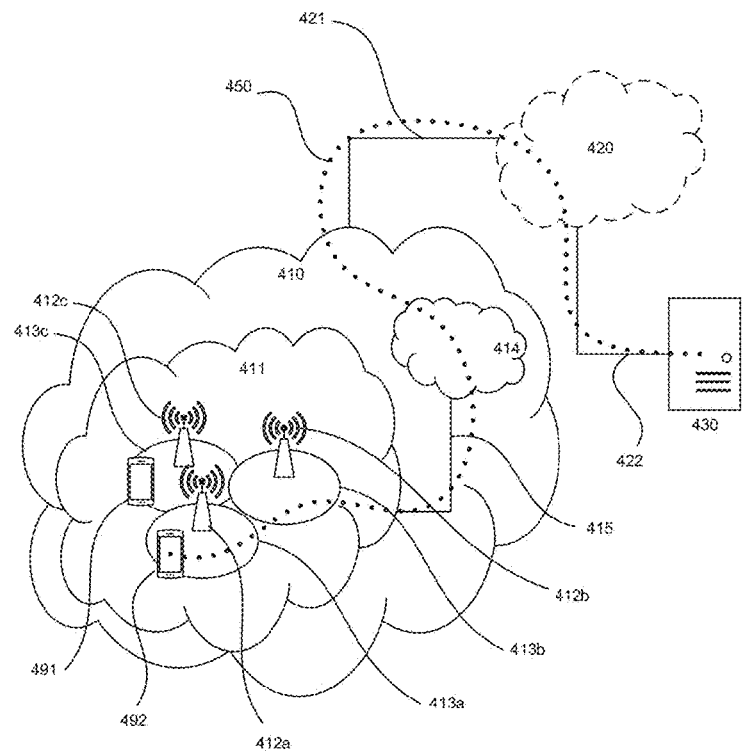
FIG. 10 illustrates a telecommunication network connected via an intermediate network to a host computer in accordance with some embodiments.

With reference to FIG. 10, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by base station 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 11:
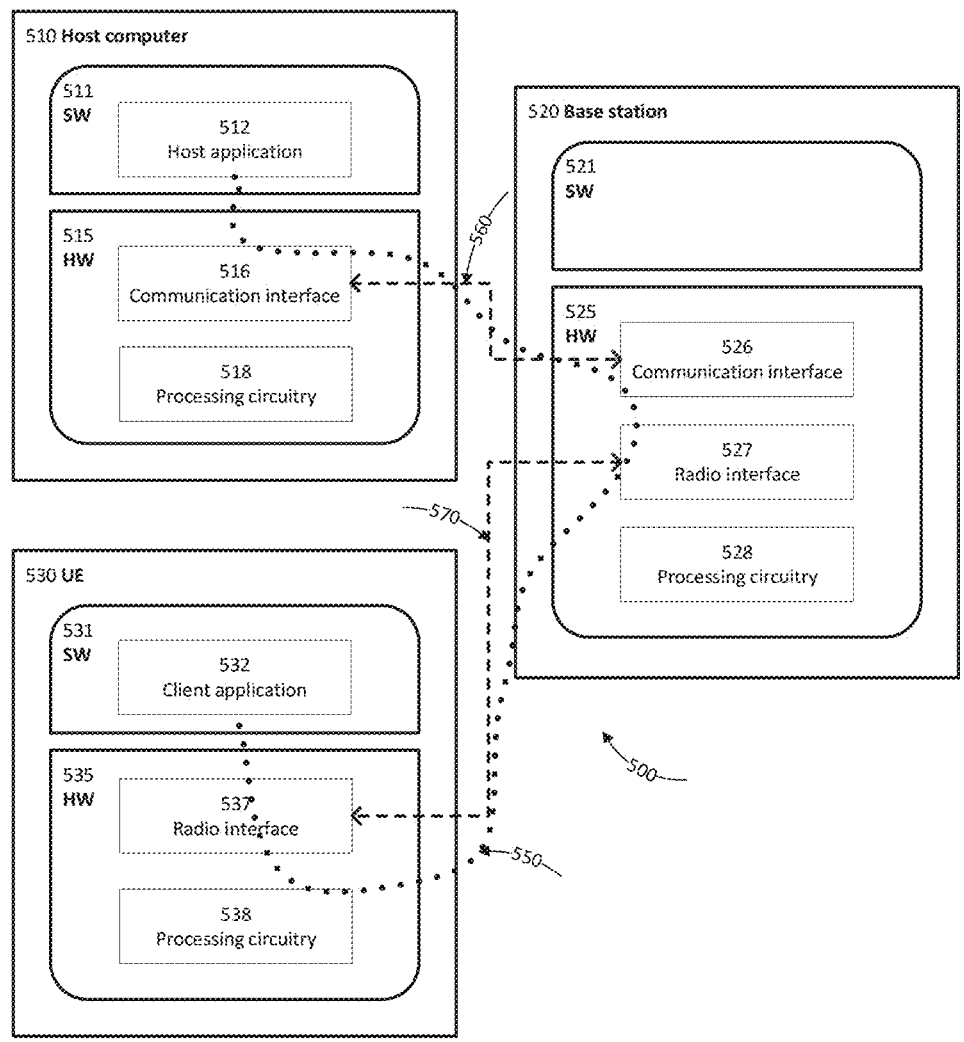
FIG. 11 illustrates a host computer communicating via a base station with a user equipment over a partially wireless connection in accordance with some embodiments.

It is noted that host computer 510, base station 520 and UE 530 illustrated in FIG. 11 may be similar or identical to host computer 430, one of base stations 412a, 412b, 412c and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the handover performance and system capacity and thereby provide benefits such as reduced user waiting time, better responsiveness, and overall improved system performance.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 12:
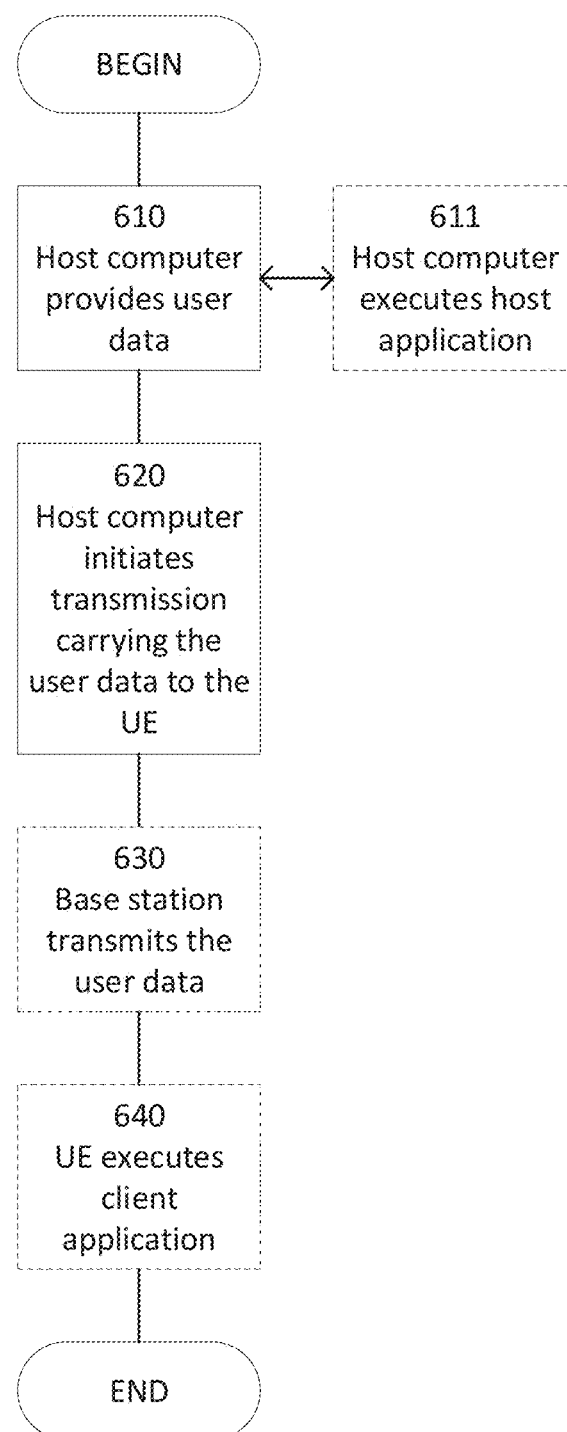
FIG. 12 illustrates methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 13:
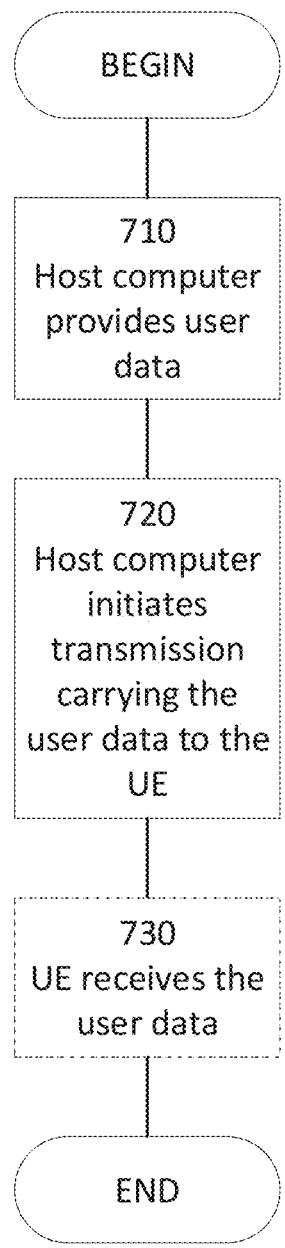
FIG. 13 illustrates methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 14:
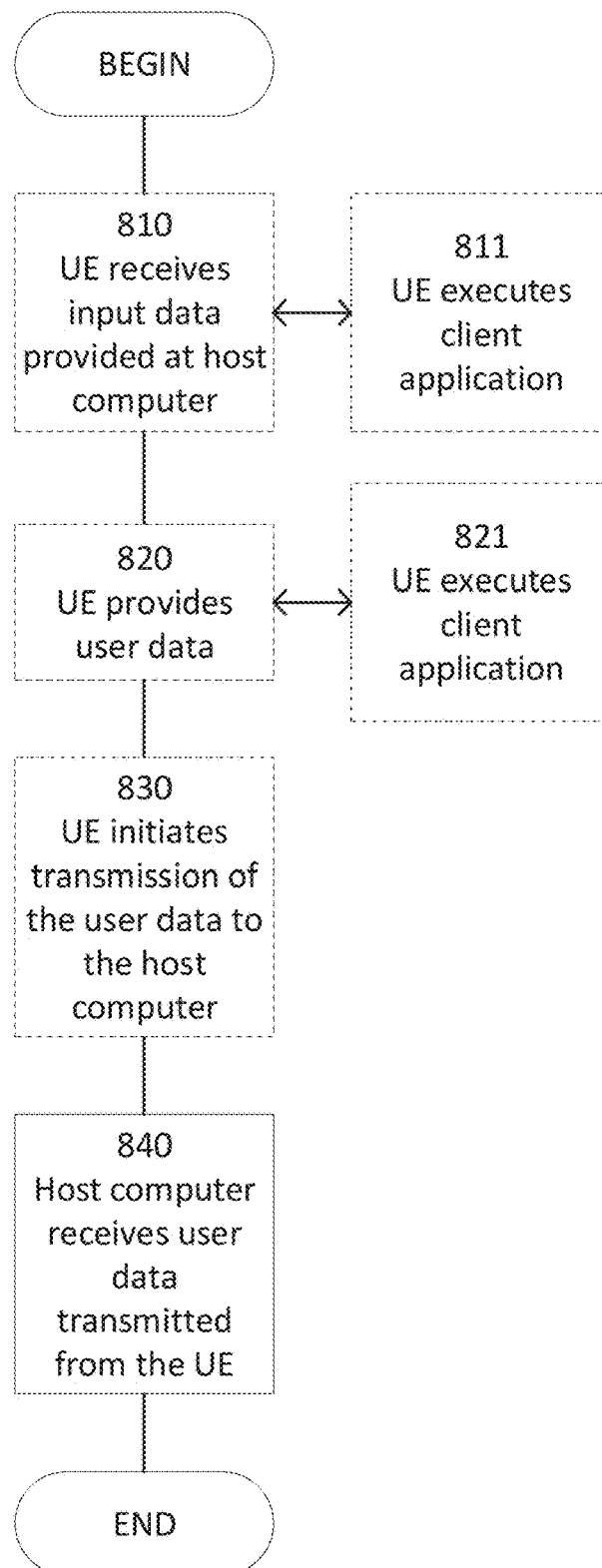
FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 15:
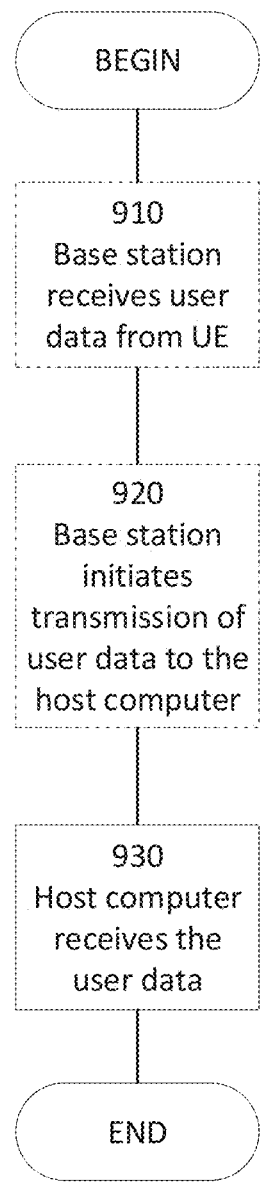
FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1×Radio Transmission Technology
3GPP 3rd Generation Partnership Project
5G 5th Generation
BCCH Broadcast Control Channel
BCH Broadcast Channel
CDMA Code Division Multiplexing Access
DL Downlink
eNB E-UTRAN NodeB
E-UTRA Evolved UTRA
E-UTRAN Evolved UTRAN
FFS For Further Study
gNB Base station in NR (corresponding to eNB in LTE)
HO Handover
IE Information Element
LTE Long-Term Evolution
MIB Master Information Block
NR New Radio
OFDM Orthogonal Frequency Division Multiplexing
OFDMA Orthogonal Frequency Division Multiple Access
PBCH Physical Broadcast Channel
PDSCH Physical Downlink Shared Channel
PLMN Public Land Mobile Network
PRACH Physical Random Access Channel
PUCCH Physical Uplink Control Channel
PUSCH Physical Uplink Shared Channel
RACH Random Access Channel
RAN Radio Access Network
RMSI Remaining Minimum System Information
RNC Radio Network Controller
RNTI Radio Network Temporary Identifier
RRC Radio Resource Control
SCH Synchronization Channel
SI System Information
SIB System Information Block
TR Technical Report
UE User Equipment
UL Uplink
UTRA Universal Terrestrial Radio Access
UTRAN Universal Terrestrial Radio Access Network
WCDMA Wide CDMA
WLAN Wide Local Area Network

What is claimed is:

1. A method of operating a wireless device in a wireless communication network, wherein the wireless device is served by a serving node in the wireless communication network, the method comprising:
   transmitting, to the serving node, an indication of system information configurations stored by the wireless device;
   receiving, from the serving node, a handover command instructing the wireless device to access a target cell in the wireless communication network, wherein the handover command indicates a selected one of the system information configurations; and
   accessing the target cell using the selected system information configuration,
   wherein the indication of system information configurations comprises a plurality of indices, each of the plurality of indices corresponding to a respective system information configuration stored by the wireless device, and wherein the handover command indicates a selected one of the plurality of indices corresponding to the selected one of the system information configurations.

2. The method according to claim 1, wherein each of the plurality of indices corresponds to a group of cells in the wireless communication network, and wherein the selected one of the plurality of indices corresponds to a selected group of cells including the target cell.

3. The method according to claim 2, wherein each of the plurality of indices corresponds to an area identifier that corresponds to an associated group of cells in the wireless communication network.

4. The method according to claim 1, wherein the system information configurations comprise system information blocks (SIBs) that include parameters for accessing a corresponding target cell in the communication network.

5. The method according to claim 4, wherein the parameters for accessing the corresponding target cell comprise common random access channel (RACH) configurations.

6. The method according to claim 1, wherein the system information configurations comprise master information blocks (MIBs) that include parameters for accessing a corresponding target cell in the communication network.

7. The method according to claim 1, wherein transmitting the indication of system information configurations stored by the wireless device to the serving node comprises:
transmitting the indication of system information configurations stored by the wireless device during a connection resume procedure.

8. The method according to claim 7, wherein the connection resume procedure comprises a radio resource control (RRC) Connection Resume request, an RRC Connection Reactivation message, an RRC Connection Resume Complete message, or an RRC Connection Reactivation Complete message.

9. The method according to claim 1, wherein transmitting the indication of system information configurations stored by the wireless device to the serving node comprises:
transmitting the indication of system information configurations stored by the wireless device during a connection setup procedure or measurement reporting.

10. The method according to claim 1, wherein transmitting the indication of system information configurations stored by the wireless device to the serving node comprises:
transmitting the indication of system information configurations stored by the wireless device with a radio resource control (RRC) measurement report, RRC setup request, and/or an RRC setup complete message.

11. The method according to claim 1, wherein transmitting the indication of system information configurations stored by the wireless device to the serving node comprises:
transmitting the indication of system information configurations stored by the wireless device with a radio resource control (RRC) Handover complete.

12. A wireless device comprising:
a transceiver configured to provide wireless network communication with a wireless communication network; and
processing circuitry coupled to the transceiver, wherein the processing circuitry is configured to provide wireless network communication through the transceiver, and wherein the processing circuitry is configured to perform operations comprising:
transmitting, to a serving node, an indication of system information configurations stored by the wireless device;
receiving, from the serving node, a handover command instructing the wireless device to access a target cell in the wireless communication network,
wherein the handover command indicates a selected one of the system information configurations; and
accessing the target cell using the selected system information configuration,
wherein the indication of system information configurations comprises a plurality of indices, each of the plurality of indices corresponding to a respective system information configuration stored by the wireless device, and wherein the handover command indicates a selected one of the plurality of indices corresponding to the selected one of the system information configurations.

* * * * *